(12) United States Patent
Drake et al.

(10) Patent No.: US 9,616,720 B2
(45) Date of Patent: Apr. 11, 2017

(54) COUPLER

(71) Applicant: Cequent Performance Products, Inc., Plymouth, MI (US)

(72) Inventors: Frank Drake, Wausau, WI (US); Eric Anderson, Plover, WI (US); Kevin Rabska, Junction City, WI (US); Kawa-She-Quoen Okerlund, Wittenberg, WI (US); Todd Krzanowski, Mosinee, WI (US)

(73) Assignee: Cequent Performance Products, Inc., Plymouth, MI (US)

( * ) Notice: Subject to any disclaimer, the term of this patent is extended or adjusted under 35 U.S.C. 154(b) by 0 days.

(21) Appl. No.: 14/713,714

(22) Filed: May 15, 2015

(65) Prior Publication Data

US 2015/0328945 A1 Nov. 19, 2015

Related U.S. Application Data

(60) Provisional application No. 61/993,685, filed on May 15, 2014.

(51) Int. Cl.
*B60D 1/46* (2006.01)
*B60D 1/06* (2006.01)
*B60D 1/42* (2006.01)

(52) U.S. Cl.
CPC ............... *B60D 1/06* (2013.01); *B60D 1/065* (2013.01); *B60D 1/42* (2013.01); *B60D 1/46* (2013.01)

(58) Field of Classification Search
CPC ................................... B60D 1/42; B60D 1/46
USPC ............................. 280/511, 504, 506, 490.1
See application file for complete search history.

(56) References Cited

U.S. PATENT DOCUMENTS

| | | | | |
|---|---|---|---|---|
| 887,382 | A * | 5/1908 | Diplock | ................. F16B 39/10 411/102 |
| 2,170,980 | A * | 8/1939 | Thorp | .................... B60D 1/065 280/512 |
| 2,847,232 | A * | 8/1958 | Graham | ................... B60D 1/46 280/490.1 |
| 3,351,116 | A * | 11/1967 | Madsen | ................. F16B 39/24 411/102 |
| 4,033,601 | A * | 7/1977 | Lindahl | .................... B60D 1/46 280/490.1 |
| 6,481,740 | B1 * | 11/2002 | Haase | .................... B60D 1/065 280/511 |

(Continued)

*Primary Examiner* — Tony Winner
(74) *Attorney, Agent, or Firm* — McDonald Hopkins LLC

(57) ABSTRACT

A channel mount coupler is shown and described. The channel mount may include a body, a socket extending from the body and configured to accept a hitch ball, and a channel mount extending from the body. The channel mount may include a first flange, the first flange including at least one aperture and at least one recess generally circumscribing the aperture, the recess being generally acircular, and a second flange spaced from the first flange. The channel mount may also include an engagement member engaged with the recess, and a fastener engageable with the engagement member and the at least one aperture, where engagement of the engagement member and recess prevents rotation of the engagement member during engagement of the fastener with the engagement member, whereby the first and second flanges are engageable with a towed vehicle.

25 Claims, 16 Drawing Sheets

(56) References Cited

U.S. PATENT DOCUMENTS

| | | | |
|---|---|---|---|
| 7,661,694 B2* | 2/2010 | Krespach | B60D 1/06 280/511 |
| 7,673,894 B2* | 3/2010 | Bender | B60D 1/07 280/406.1 |
| 7,690,673 B1* | 4/2010 | Kraai | B60D 1/60 280/507 |
| 7,871,098 B2 | 1/2011 | Drake et al. | |
| 8,083,250 B2 | 12/2011 | Drake et al. | |
| 8,733,781 B2* | 5/2014 | Sims | B60D 1/465 254/420 |
| 9,415,647 B2* | 8/2016 | Woolf | B60D 1/46 |
| 2005/0057019 A1* | 3/2005 | Colibert | B60D 1/065 280/405.1 |
| 2005/0143078 A1* | 6/2005 | Wilson | H04W 36/04 455/449 |

* cited by examiner

COUPLER

CROSS-REFERENCE TO RELATED APPLICATION

This application claims benefit from U.S. Provisional Patent Application No. 61/993,685, entitled "COUPLER," filed on May 15, 2014, which is hereby incorporated in its entirety by reference.

FIELD OF THE INVENTION

The present invention relates generally to hitch ball couplers for towed vehicles, and more particularly, to adjustable mount couplers for towed vehicles.

BACKGROUND

Hitch ball couplers are often used to secure towed vehicles to towing vehicles. Common towed vehicles include campers and towing trailers arranged to secure items such as boats, automobiles, and the like. Towing vehicles most commonly include trucks, tractors, and the like. Hitch ball couplers are typically secured to a tongue extending from the towed vehicle and arranged such that the hitch ball coupler may be secured to a hitch ball attached to the towing vehicle.

Current hitch ball couplers are comprised of a collar lock assembly welded to a coupler channel and tongue end while capturing a cap spring with support washers. It is very labor intensive to weld all of these components together, which increases the time to assemble the hitch ball coupler and increases its cost.

Further, prior art hitch ball couplers typically attach to a mounting channel with two bolts. The bolts normally pass through the mounting channel and hitch ball coupler mounting holes. Nuts are often used to secure the mounting bolts to the mounting channel. This, however, allows the hitch ball coupler to rattle around on the bolts between the mounting channel. This may create an unsatisfactory condition—it may result in unacceptable noise and may cause premature wear.

A typical hitch ball coupler starts out level or perpendicular to the mounting channel, but under load will deflect the hitch ball coupler slightly upwards. This is perceived as unappealing visually and functionally.

Further, in the market there are typically two mounting channel widths: 2.875" and 3.00". In response, hitch ball couplers may be specifically designed for each of these particular widths. However, if a user needs to switch between these widths, the user will need two hitch ball couplers. Further, if a user attempts to attach a hitch ball coupler intended for use with a mounting channel width of 3.00" on the mounting channel width of 2.875" an undesired rattling and misfit may occur.

Therefore, there is a need for an improved hitch ball coupler to overcome the deficiencies noted above. For example, there is a need for a hitch ball coupler that may operatively secure with mounting channels having widths of 2.875" and 3.00". Further, there is a need for a hitch ball coupler that includes an anti-rattle feature to generally prevent rattling during operation thereof. Further still, there is a need for a hitch ball coupler that includes an anti-sag feature to generally maintain the hitch ball coupler level or perpendicular to the mounting channel.

SUMMARY

A channel mount coupler is shown and described. The channel mount may include a body, a socket extending from the body and configured to accept a hitch ball, and a channel mount extending from the body. The channel mount may include a first flange, the first flange including at least one aperture and at least one recess generally circumscribing the aperture, the recess being generally acircular, and a second flange spaced from the first flange. The channel mount may also include an engagement member engaged with the recess, and a fastener engageable with the engagement member and the at least one aperture, where engagement of the engagement member and recess prevents rotation of the engagement member during engagement of the fastener with the engagement member, whereby the first and second flanges are engageable with a towed vehicle.

A channel mount coupler may include a body, a socket extending from the body, the socket configured to accept a hitch ball, and a channel mount extend from the body. The channel mount may include a first flange, the first flange including first and second apertures spaced apart and offset from one another, and a second flange spaced from the first flange, where the first and second flanges are engageable with a towed vehicle.

A channel mount coupler may include a body, a socket extending from the body, the socket configured to accept a hitch ball, and a channel mount extending from the body. The channel mount may include a first flange, the first flange having a first thickness, and a second flange spaced from the first flange, the second flange having a second thickness, where the first thickness is greater than the second thickness and the first and second flanges are engageable with a towed vehicle.

BRIEF DESCRIPTION OF THE DRAWINGS

The present teachings may be better understood by reference to the following detailed description taken in connection with the following illustrations, wherein.

DETAILED DESCRIPTION

Figure 1:
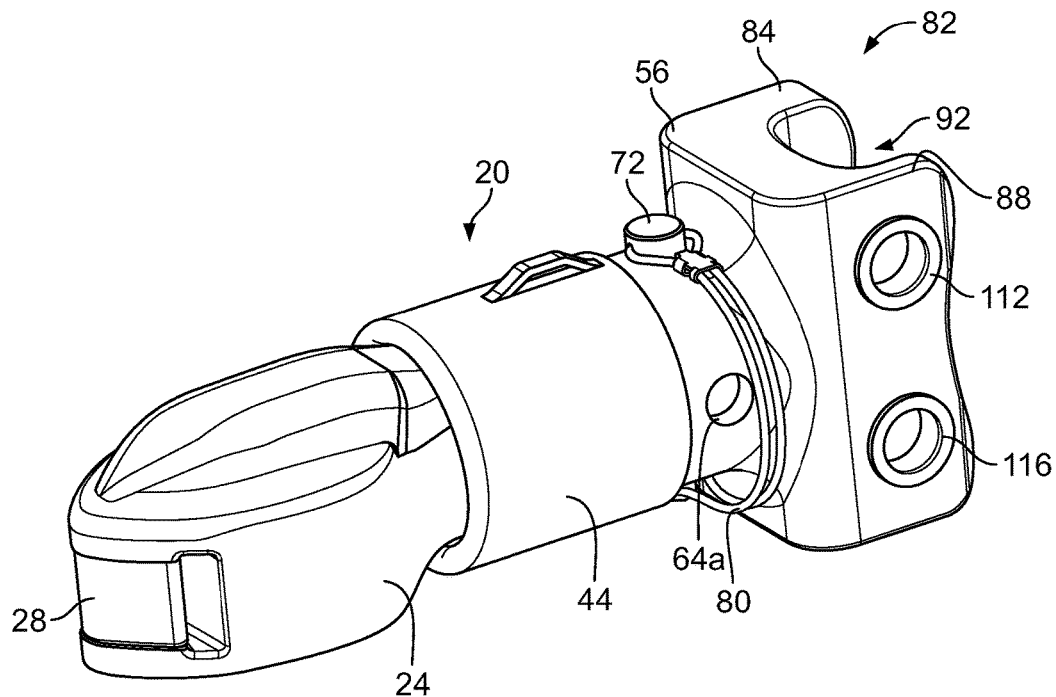
FIG. 1 is a perspective view of an embodiment of an adjustable mount coupler in a closed position.
Figure 2:
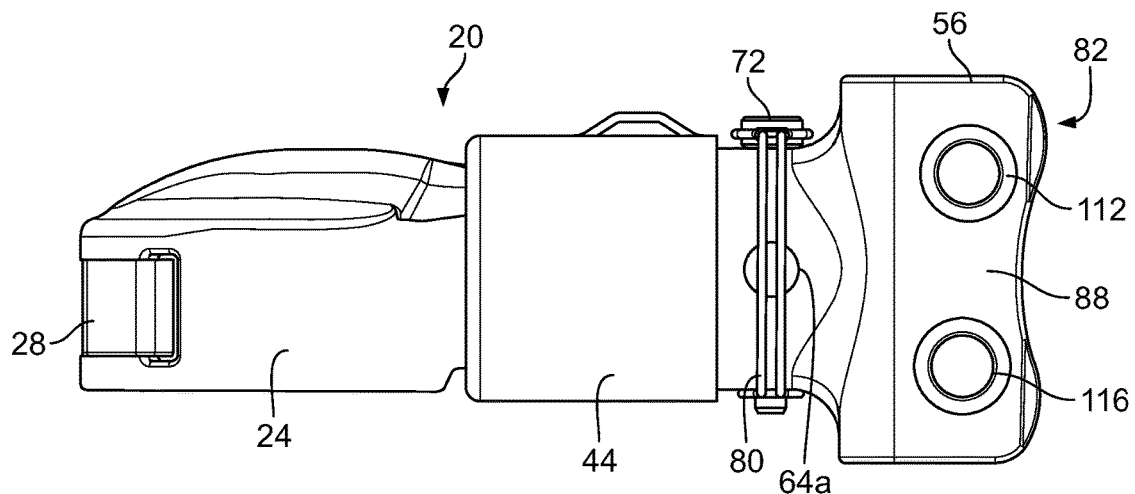
FIG. 2 is side view of the adjustable mount coupler.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

With reference to FIGS. 1-11, a hitch ball coupler or more specifically an adjustable mount coupler 20 is shown and described. The adjustable mount coupler 20 may include a body 24 and a cap 28 of any appropriate configuration. The cap 28 and body 24 may be pivotably coupled together. For example, a hinge 32 positioned at a front or nose portion of the adjustable mount coupler 20 may be utilized to pivotably couple the cap 28 with the body 24. The body 24 and cap 28 may be arranged to form a cavity or a socket 36 that is generally semispherical in shape. By way of a non-limiting example, recesses in both the body 24 and cap 28 may cooperate to form the socket 36. The socket 36 may be generally arranged to accommodate or receive a spherically shaped hitch ball mounted to a towing vehicle. The socket 36 may be arranged to accept hitching components that have shapes other than spherical depending on the intended use of the adjustable mount coupler 20.

Figure 3:
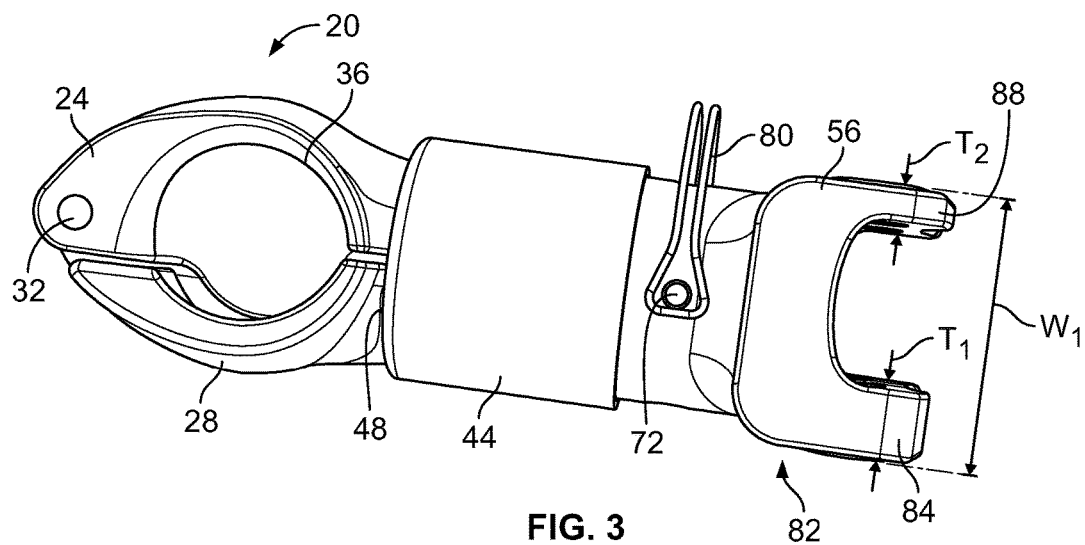
FIG. 3 is a bottom view of the adjustable mount coupler.
Figure 4:
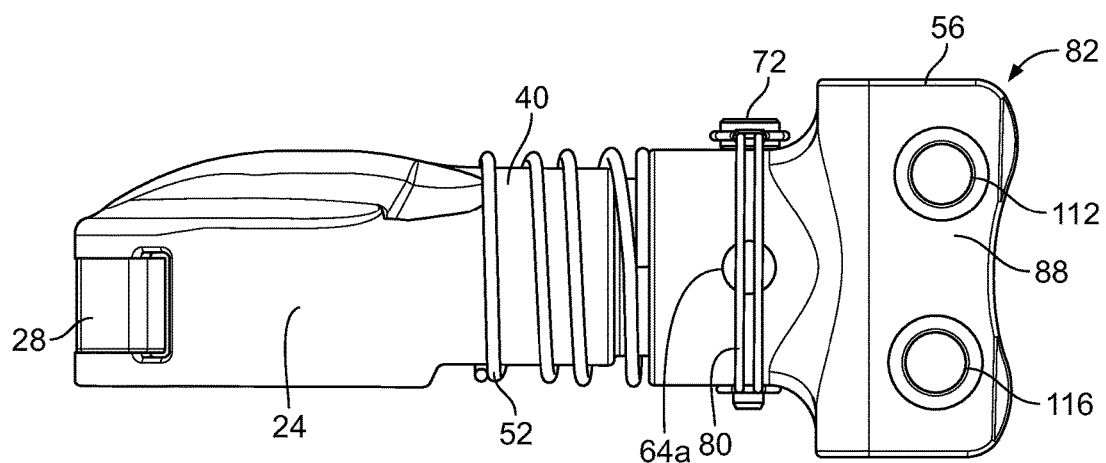
FIG. 4 is a side view of the adjustable mount coupler with a sleeve removed.
Figure 5:
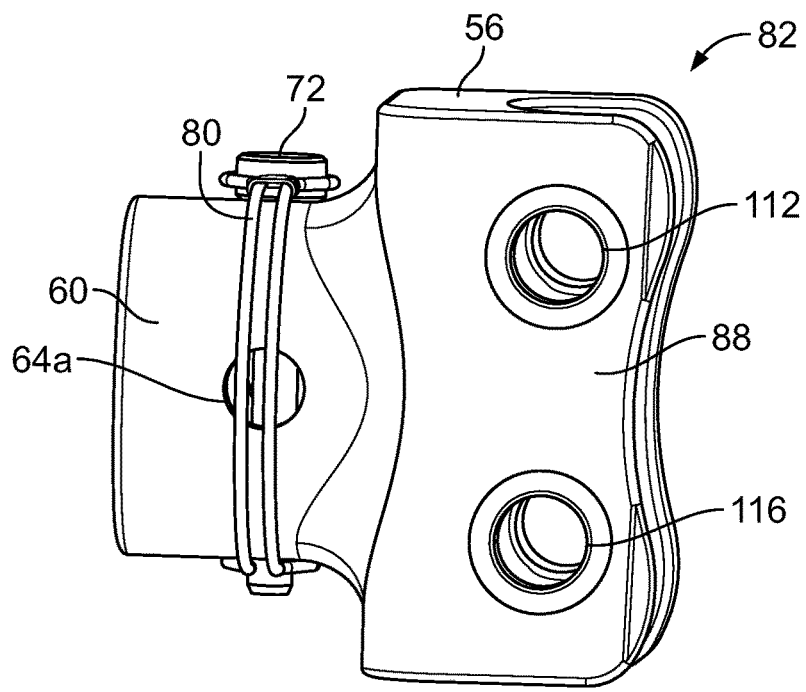
FIG. 5 is a side view of an adjustable channel trailer mount of the adjustable mount coupler.
Figure 6:
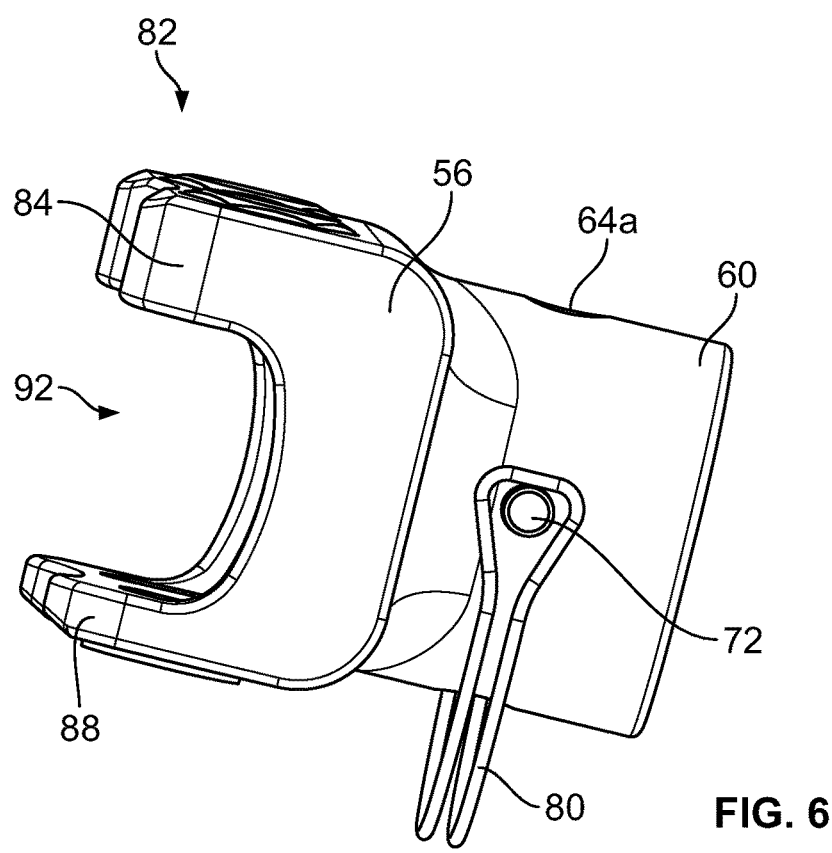
FIG. 6 is a bottom view the adjustable channel trailer mount of the adjustable mount coupler.
Figure 7:
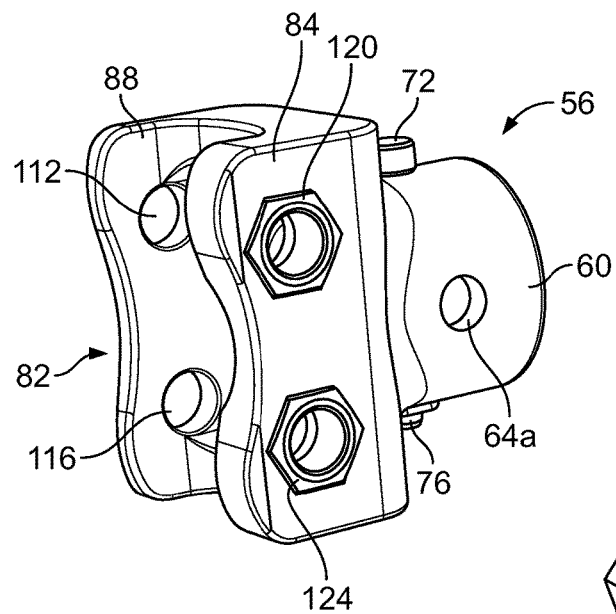
FIG. 7 is a side perspective view of the adjustable channel trailer mount of the adjustable mount coupler.
Figure 8:
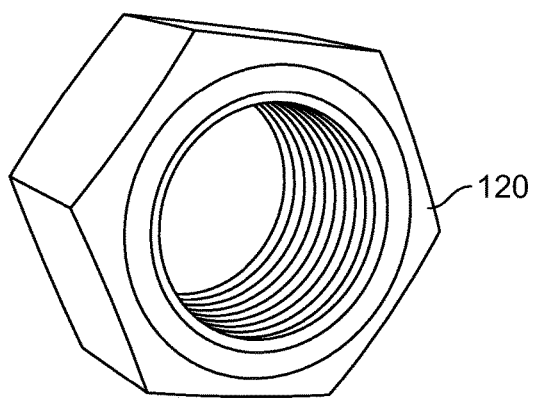
FIG. 8 is a perspective view of an engaging nut of the adjustable channel trailer mount of the adjustable mount coupler.

The adjustable mount coupler 20 may be arranged so that the cap 28 may rotate about the hinge 32 or otherwise move between a closed position and an open or expanded position. The closed position is best shown in FIG. 3. In the closed position, the cap 28 and body 24 are in contact at the hinge 32 and at the portion opposite the hinge 32. It will be understood by one of ordinary skill the art that when a hitch ball is received in the socket 36 and the adjustable mount coupler 20 is in the closed position, the adjustable mount coupler 20 may be physically secured with the hitch ball. In the open position, the cap 28 and body 24 are in contact at the hinge 32, but are separated at the portion opposite the hinge 32. It will be understood by one of ordinary skill the art that when the adjustable mount coupler 20 is in the open position, a hitch ball may be selectively received and removed from the socket 36 of the adjustable mount coupler 20.

The body 24 of the adjustable mount coupler 20 may include a generally hollow tubular portion 40 extending from the cap 28. The generally hollow tubular portion 40 may be monolithically formed with the body 24 or may be attached through a subsequent operation, including, without limitation via welding, fastening or adhering. While the tubular portion 40 is shown as being generally hollow, the present teachings are not limited to such. By way of a non-limiting example, the tubular portion 40 may be generally solid.

The adjustable mount coupler 20 may include a collar 44 mounted to a rear portion 48 of the body 24. The collar 44 may be mounted so that it may slide toward and away from the cap 28 and body 24. The adjustable mount coupler 20 may be configured such that when it is placed in the closed position, the collar 44 may slide toward the cap 28 and body 24 to hold the cap 28 proximate to or in contact with the body 24. Such an arrangement secures the cap 28 in close proximity with the body 24 and, thus, secures the adjustable mount coupler 20 in the closed position. When the collar 44 is slid rearward and away from the cap 28 and body 24, the cap 28 is free to rotate about the hinge 32 into the open position. In a non-limiting example, the collar 44 may be operably coupled to an actuating handle wherein the handle is operable to slide and hold the collar 44 in either the forward or rearward positions. Other arrangements operable to slide or hold the collar 44 in a position will be apparent to one of ordinary skilled in the art.

In a non-limiting example, a spring (not shown) may be arranged in the adjustable mount coupler 20 to bias the adjustable mount coupler 20 to the open position. The spring may be positioned relative to the cap 28 to bias the cap 28 in the open position. In these embodiments, the operator may overcome the biasing force of the spring to close the cap 28 relative to the body 24. Further, the adjustable mount coupler 20 may include a biasing member 52 such as a spring, which may bias the collar 44 toward the cap 28 and body 24, i.e., a forward position. The biasing member 52 may generally circumscribe the tubular portion 40 biasing the collar 44 toward the cap 28. When the collar 44 is in the forward position, it may releasably secure the cap 28 proximate to or in contact with the body 24 to secure the adjustable mount coupler 20 in the closed position. It will be appreciated by those of ordinary skill in the art that the collar 44 may be moved or slid away from the cap 28 and body 24 to a rear position to release the cap 28 from contact with the body 24. This allows the spring to move the adjustable mount coupler 20 to the open position.

The adjustable mount coupler 20 may include a channel mount 56 attached with the body 24 in any appropriate manner. By way of a non-limiting example, the channel mount 56 may be attached with the tubular portion 40 of the body 24 in any appropriate manner. The channel mount 56 may be adjustable as is described in more detail below, e.g., it may attach with a plurality of different sized towed vehicles. It should be further understood that the channel mount 56 may be operatively attached with any coupler assembly. The present teachings are not limited to the coupler assembly as shown and described. By way of a non-limiting example, cast couplers, wedge lock couplers, collar lock couplers, and any other type or configuration of a coupler assembly may have attached thereto the channel mount 56 described below. In those embodiments, the channel mount 56 may be attached to the applicable coupler in any appropriate manner.

Figure 11:
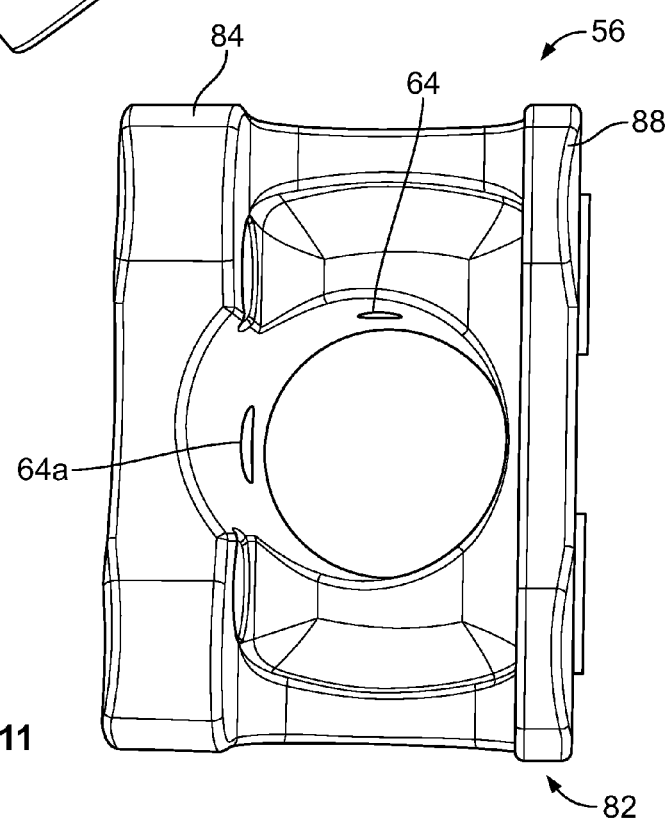
FIG. 11 is rear view of the adjustable channel trailer mount of the adjustable mount coupler.

In some embodiments, the channel mount 56 may include a body engaging portion 60 selectively engageable with the tubular portion 40 of the body 24. The body engaging portion 60 may be of any appropriate configuration and is not limited to that shown and described herein. The body engaging portion 60 may be of a corresponding shape of the tubular portion 40. For example, the body engaging portion 60 may be of a generally circular cross-sectional shape and may be of a size to accept the tubular portion 40 therein. Additionally, the tubular portion 40 may be adapted to accept the body engaging portion 60 therein. In these embodiments, the body engaging portion 60 may be generally hollow, such as shown in FIG. 11. The tubular portion 40 may be inserted within the hollow portion of the body engaging portion 60. The tubular potion 40 and body engaging portion 60 may be attached in any appropriate manner as described in more detail below. Further, the body engaging portion 60 may be inserted into the tubular portion 40.

The body engaging portion 60 may include at least one aperture 64. As shown in the drawings, the body engaging portion 60 may include first and second pairs of apertures 64, 64a. The first pair of apertures 64 may be positioned on vertically opposed sides of the body engaging portion 60. The second pair of apertures 64a may be positioned on horizontally opposed sides of the body engaging portion 60, which results in the apertures 64, 64a being generally spaced around the circumference of the body engaging portion 60. In these embodiments, the apertures 64, 64a may be positioned such that they extend into the hollow portion of the body engaging portion 60. This may result in the apertures 64, 64a extending through the body engaging portion 60. The present teachings, however, are not limited to this configuration. Any appropriate configuration may be utilized without departing from the present teachings. In some embodiments, the apertures 64 may be utilized to operatively engage the tubular portion 40 with the body engaging portion 60 as described in more detail below. Further, in some embodiments the apertures 64a may be utilized to plug weld the body engaging portion 60 with the tubular portion 40.

Figure 12:
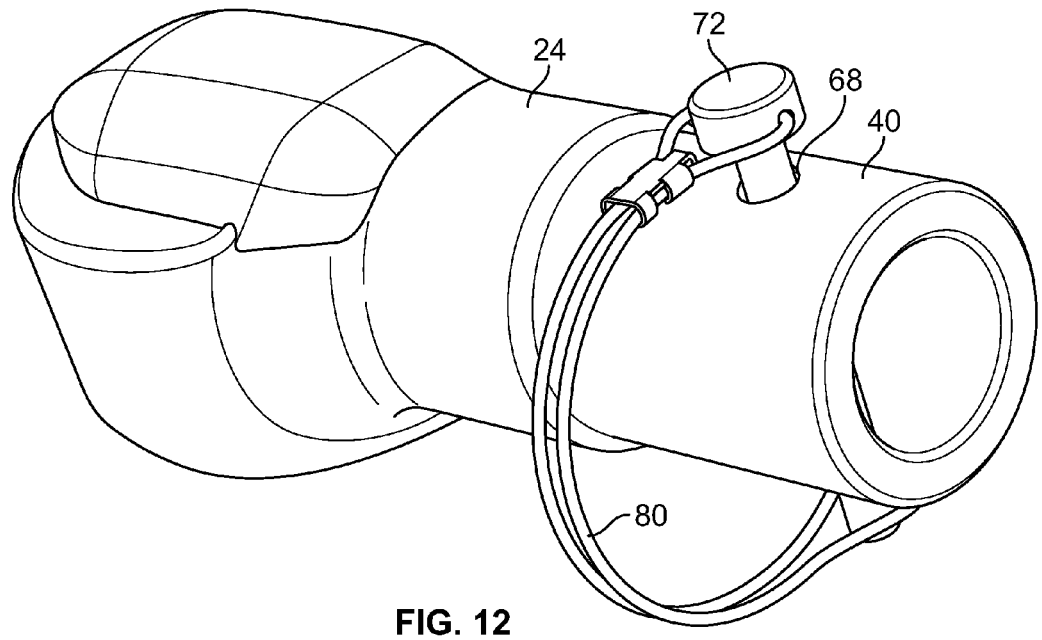
FIG. 12 is a rear perspective view of a body of an adjustable mount coupler.
Figure 13:
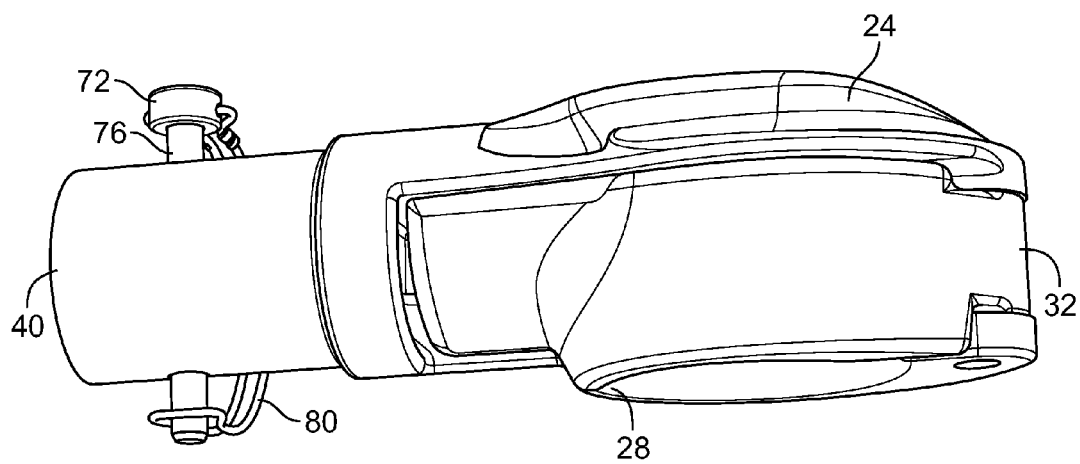
FIG. 13 is a side view of a body and cap of an adjustable mount coupler.

The tubular portion 40 may include a pair of opposed apertures 68 as shown in FIG. 12. The apertures 68 may generally align with the first pair of apertures 64 of the body engaging portion 60 upon operative engagement of the tubular portion 40 and body engaging portion 60. In these embodiments, a fastener 72 may be vertically inserted into and engaged with the apertures 64 of the body engaging portion 60 and apertures 68 of the tubular portion 40. The fastener 72 may be of any appropriate configuration. By way of a non-limiting example, the fastener 72 may be a snapper pin 72 as shown in FIGS. 1-4 and 12-13. The snapper pin 72 may be inserted into the apertures 64 and 68, of the body engaging portion 60 and the tubular portion 40, respectively.

The snapper pin 72 may be of any appropriate configuration and is not limited to that shown and described herein. For example, the snapper pin 72 may include a pin portion 76 shaped and sized to extend through the apertures 64 and 68. The snapper pin 72 may further include a retainer portion 80 that may operative engage with the pin portion 76 to generally prevent removal of the pin portion 76 from the apertures 64 and 68. In other embodiments, the body engaging portion 60 and tubular portion 40 may be attached such as through welding or adhering. Further still, any type of fastener—such as a bolt—may be utilized to operatively attach the body engaging portion 60 and tubular portion 40.

The channel mount 56 may include a towed vehicle engaging portion 82 configured to be operatively secured with the towed vehicle in any appropriate manner. The towed vehicle engaging portion 82 may be of any appropriate configuration. By way of a non-limiting example, the towed vehicle engaging portion 82 may include a pair of flanged members—a first flanged member 84 and a second flanged member 88—extending from the body engaging portion 60. The flanged members 84, 88 may be attached with the body engaging portion 60 in any appropriate manner. By way of a non-limiting example, the flanged members 84, 88 may be monolithically formed with the body engaging portion 60. The flanged members 84, 88 may be attached with the body engaging portion 60, such as through welding, fastening or the like. In these embodiments, the first and second flanged members 84, 88 may be spaced apart from one another. This may result in a channel or void 92 being positioned between the first and second flanged member 84, 88.

The first flanged member 84 may be generally thicker than the second flanged member 88. As shown in FIG. 3, the first flanged member 84 may have a thickness of $T_1$ and the second flanged member 88 may have a thickness $T_2$. As shown, the thickness $T_1$ may be larger than the thickness $T_2$. It should be understood that while the first flanged member 84 is shown being thicker than the second flanged member 88, the towed vehicle engaging portion 82 may be the opposite, i.e., the second flanged member 88 may be thicker than the first flanged member 84. Further still, the first and second flanged members 84, 88 may have substantially identical thickness $T_1$ and $T_2$.

Figure 14:
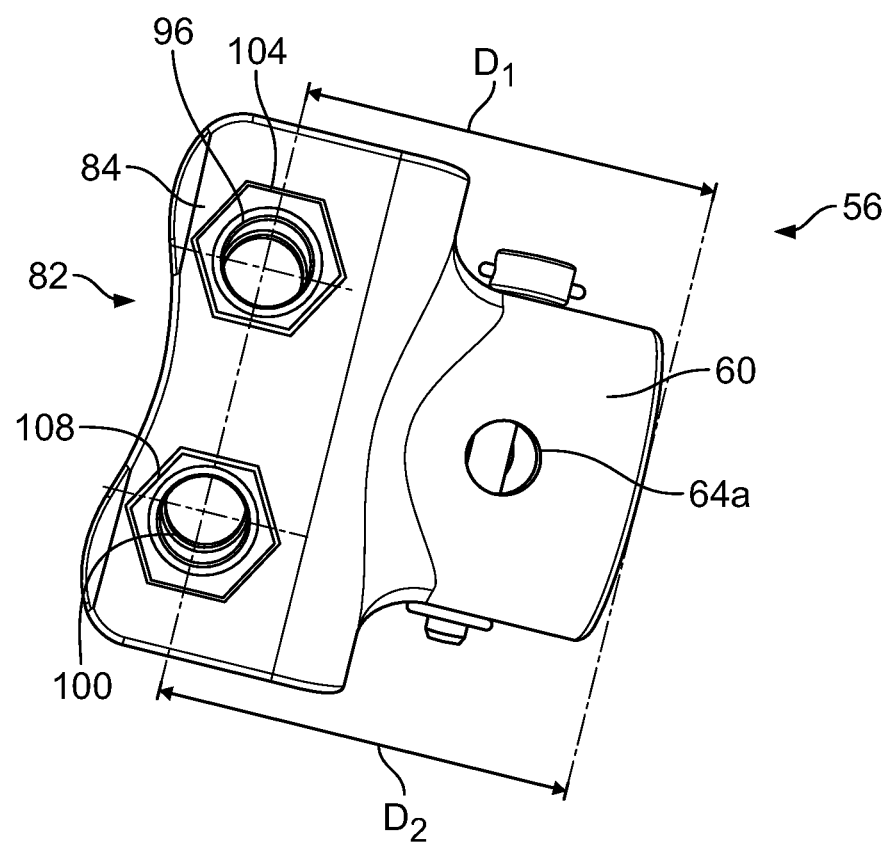
FIG. 14 is a side view of the channel mount of the adjustable mount trailer coupler.

The first flanged member 84 may include first and second apertures 96, 100 laterally spaced from one another. The first and second apertures 96, 100 may be offset from one another as shown in FIG. 14. Specifically, the distance $D_1$ from an edge of the body engaging portion 60 to a center of the first aperture 96 may be different from the distance $D_2$ from the edge of the body engaging portion 60 to a center of the second aperture 100. By way of a non-limiting example, the distance $D_1$ may be greater than the distance $D_2$. Further, the distance $D_1$ may be less than the distance $D_2$. It should be understood, however, that the distance $D_1$ and $D_2$ may be measured from the other edge of the first flanged member 84. In that situation $D_2$ may be greater than $D_1$—i.e., $D_1$ and $D_2$ are different.

The first flanged member 84 may further include first and second recessed portions 104, 108, respectively generally circumscribing the first and second apertures 96, 100. The first and second recessed portions 104, 108 may be of any appropriate configuration. In particular, the first and second recessed portions 104, 108 may have a generally acircular shape. The shape of the first and second recessed portions 104, 108 may create a non-rotational surface as described in more detail below. It should be understood, the first and second recessed portions 104, 108 may be of any appropriate size and shape and is not limited to that shown and described herein.

The second flanged portion 88 may include third and fourth apertures 112, 116 laterally spaced from one another. The third and fourth apertures 112, 116 may be offset from one another and may be generally aligned with respect to the first and second apertures 96, 100, respectively. The first, second, third and fourth apertures 96, 100, 112, and 116 may be offset as described above, which may provide an anti-sag feature for the adjustable mount coupler 20 when operatively secured with the towing and towed vehicles. The offset aperture pattern may result in the adjustable mount coupler 20 being angled slightly downward when in its operative position, i.e., when operatively coupled with the towing and towed vehicle. This downward angle may allow the adjustable mount coupler 20 to remain generally level or perpendicular to the towed vehicle when under an operative load. This may generally prevent unwanted or undesirable sagging between the adjustable mount coupler 20 and the towed vehicle.

Further, the first, second, third and fourth apertures 96, 100, 112, and 116 may be configured to accept a fastener (not shown) that may selectively attach the channel mount 56 with the towed vehicle. The first and third apertures 96, 112 may be generally aligned to accept a fastener of any appropriate configuration. The second and fourth apertures 100, 116 may be generally aligned to accept a fastener of any appropriate configuration.

Figure 9:
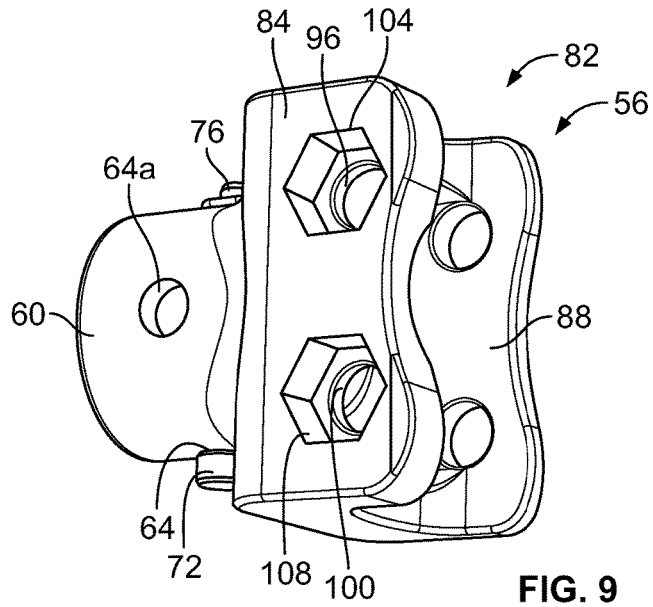
FIG. 9 is a side perspective view of the adjustable channel trailer mount of the adjustable mount coupler.
Figure 10:
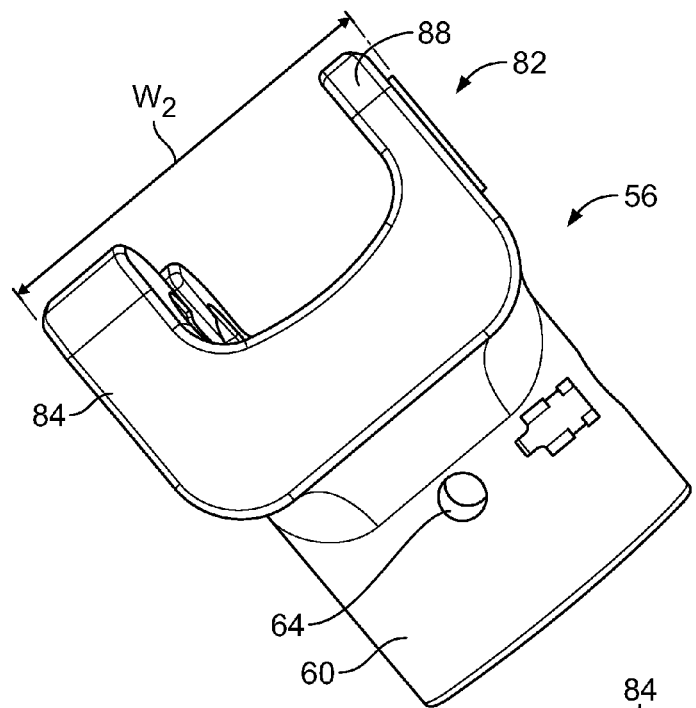
FIG. 10 is a top view of the adjustable channel trailer mount of the adjustable mount coupler.

The channel mount 56 may further include first and second engagement members 120, 124, respectively, that may be operatively engaged within the first and second recesses 104, 108. The engagement members 120, 124 may be of any appropriate configuration, including, by way of a non-limiting example, acircular nuts—see FIG. 8. The engagement members 120, 124 may be configured to operatively fit within the first and second recesses 104, 108, which may be of substantially similar configuration or of a different configuration. The configurations of the engagement members 120, 124 and the first and second recesses 104, 108 may be such that once the engagement members 120, 124 are inserted into the first and second recesses 104, 108, the engagement members 120, 124 are generally prevented from rotating. By way of a non-limiting example, and as shown in FIGS. 9 and 14, the first and second recess 104, 108 may have a generally hexagonal shape. The engagement members 120, 124 may have a similar hexagonal shape or may have different acircular shapes. It should be understood, however, that the engagement members 120, 124 and the first and second recesses 104, 108 may be of any appropriate shape and is not limited to the shapes shown and described herein. By way of a non-limiting example, the engagement members 120, 124 and the first and second recesses 104, 108 may be of a generally acircular shape.

The engagement of the engagement members 120, 124 and the first and second recesses 104, 108 may generally prevent rotation of the engagement members 120, 124 during operative engagement of the fasteners with the coupler mount 56, or more specifically, the towed vehicle engaging portion 82 with the towed vehicle. This may make engagement between the adjustable mount coupler 20 and the towed vehicle easier for the operator.

In some embodiments, the first flanged member 84 may not include the first and second recessed portions 104, 108 or may include the first and second recessed portions 104, 108 but may not include the engagement members 120, 124. This is described in more detail below. In these embodiments, the first and second apertures 96, 100 may include an engaging feature, including, without limitation, a threaded portion. The fasteners may include a mating engaging feature, such as by way of a non-limiting example, a threaded portion. The fasteners may be inserted into the first and second apertures 96, 100 and threaded therein.

In some embodiments, the mount coupler 56 may have a width $W_1$ of the first and second flanged members 84, 88 and the channel 92 therebetween. The width $W_1$ may be of any appropriate measure. By way of a non-limiting example, the width $W_1$ of the first flanged member 84, the channel 92, the second flanged member 88 and the engagement members 120, 124 may be approximately 3". As most towed vehicles have a channel width of either of 3" or 2.875". These embodiments may be operatively coupled with the towed vehicles having a channel width of 3".

To accommodate those towed vehicles having a channel width of approximately 2.875" the engagement members 120, 124 may be removed from the first and second recesses 104, 108. Once the engagement members 120, 124 are so removed, the width $W_2$ of the first flanged member 84, the channel 92, and the second flanged member 88 may be 2.875". In these embodiments, the fasteners may operatively engage with the apertures 96, 100. It should be understood, however, that the present teachings are not limited these dimensions. Any appropriate dimensions may be utilized with the present teachings.

Further still, the engagement members 120, 124 may generally prevent rattling that may otherwise occur upon operative engagement of the channel mount 56 with the towed vehicle. In these embodiments, the fasteners may be threaded through the engagement members 120, 124 during operative installation. By tightening the fasteners with the engagement members 120, 124; the channel mount 56 is pulled tight to one side of the channel 92, which generally prevents rattle. The fastener may have sufficient length to pass through both sides of the channel mount 56. The fastener may or may not require an additional nut on the outside of the channel mount 56.

In those embodiments in which the engagement members 120, 124 are not utilized, i.e., in use with 2.875" channel mount, the first and second apertures 96, 100 may include threaded portions. In such embodiments, the fasteners may be threaded through the threaded first and second apertures 96, 100 during operative installation. By tightening the fasteners with the threads of the first and second apertures 96, 100, the channel mount 56 is pulled tight to one side of the mounting channel of the towed vehicle, which may generally prevent rattle.

Additional embodiments of a hitch ball coupler according the present teachings are described below. In the descriptions, all of the details and components may not be fully described or shown. Rather, the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired hitch ball coupler without departing from the spirit and scope of the present invention.

Figure 15:
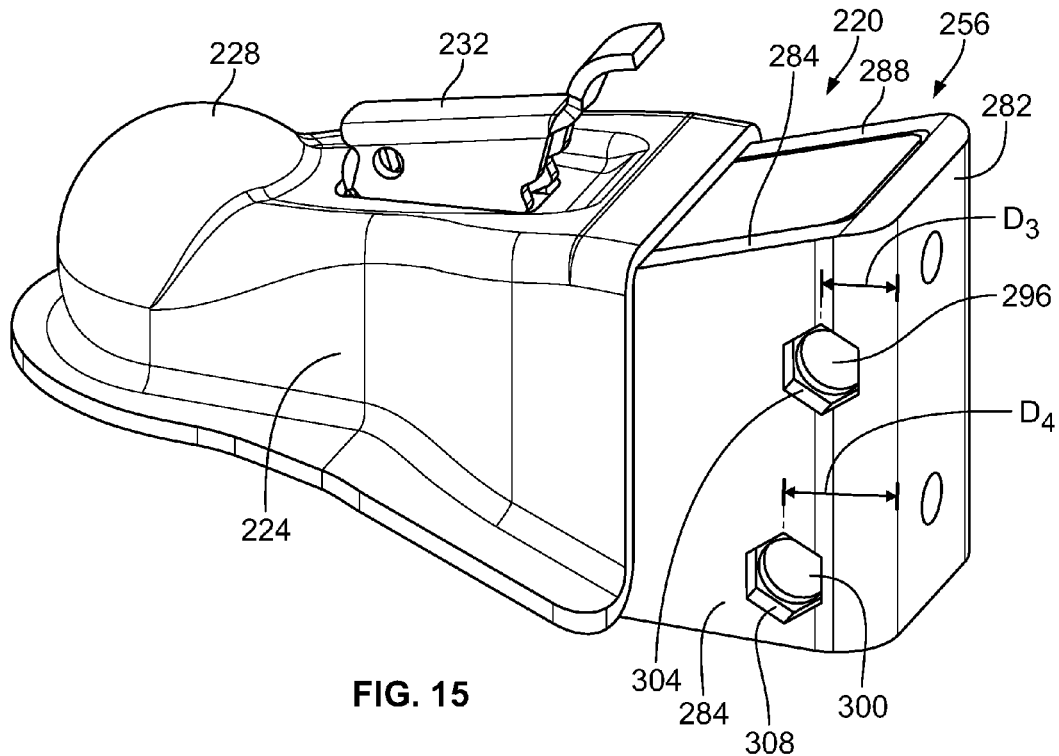
FIG. 15 is a perspective view of an embodiment of an adjustable mount coupler.

A further exemplary embodiment of an adjustable mount coupler 220 is shown in FIG. 15. The adjustable mount coupler 220 may be a 2 5/16 of an inch steel version of a hitch ball coupler. The adjustable mount coupler 220 may include a body 224. The body 224 may be formed of any appropriate material, including, without limitation steel. The body 224 may be cast, stamped, or formed in any other appropriate method. The body 224 may include a socket 228. The socket 228 may be configured to operatively and selectively engage a correspondingly shaped and sized hitch ball (not shown) of a towing vehicle.

The adjustable mount coupler 220 may further include a handle 232 operatively secured to the body 224. The handle 232 may be actuated to operatively and selectively engage and disengage the hitch ball when positioned within the socket 228. The handle 232 may be of any appropriate configuration. The present teachings are not limited to the configuration shown.

The adjustable mount coupler 220 may further include a channel mount 256. The channel mount 256 may be configured to operatively secure the adjustable mount coupler 220 with a towed vehicle. The channel mount 256 may include a towed vehicle engaging portion 282 configured to be operatively secured with the towed vehicle in any appropriate manner. The towed vehicle engaging portion 282 may be of any appropriate configuration.

The towed vehicle engaging portion 282 may include first and second end portions 284, 288, respectively. In some embodiments, the first end portion 284 may include first and second apertures 296, 300 laterally spaced from one another. The first and second apertures 296, 300 may be offset from one another as shown in FIG. 15. Specifically, the distance $D_3$ from an edge of the boxed portion 282 to a center of the first aperture 296 may be different from the distance $D_4$ from the edge of the edge of the boxed portion 282 to a center of the second aperture 300. By way of a non-limiting example, the distance $D_3$ may be less than the distance $D_4$. Further, the distance $D_3$ may be greater than the distance $D_4$, i.e., the first and second apertures 296, 300 may be offset the other direction.

The first end portion 284 may further include first and second recessed portions 304, 308, respectively generally circumscribing the first and second apertures 296, 300. The first and second recessed portions 304, 308 may be of any appropriate configuration. In particular, the first and second recessed portions 304, 308 may have a generally acircular shape. The shape of the first and second recessed portions 304, 308 may create a non-rotational surface as described in more detail below. It should be understood, the first and second recessed portions 304, 308 may be of any appropriate size and shape and is not limited to that shown and described herein. The first and second recessed portions 304, 308 may be cast or stamped with the channel mount 256 and may also be formed with the body 224.

The second end portion 288 may include third and fourth apertures be offset from one another and may be generally aligned with respect to the first and second apertures 296, 300, respectively. The apertures being offset may provide an anti-sag feature for the adjustable mount coupler 220 when operatively secured with the towing and towed vehicles. The offset aperture pattern may result in the adjustable mount coupler 220 being angled slightly downward when in its operative position, i.e., when operatively coupled with the towing and towed vehicle. This downward angle may allow the adjustable mount coupler 220 to remain generally level or perpendicular to the towed vehicle when under an operative load. This may generally prevent unwanted or undesirable sagging between the adjustable mount coupler 220 and the towed vehicle.

The channel mount 256 may further include the first and second engagement members 120, 124 described above. Specifically, the first and second engagement members 120, 124 may be operatively engaged within the first and second recesses 304, 308. The engagement members 120, 124 may be of any appropriate configuration, including, by way of a non-limiting example, acircular nuts—see FIG. 8. The engagement members 120, 124 may be configured to operatively fit within the first and second recesses 304, 308, which may be of substantially similar configuration or of a different configuration. The configurations of the engagement members 120, 124 and the first and second recesses 304, 308 may be such that once the engagement members 120, 124 are inserted into the first and second recesses 304, 308, the engagement members 120, 124 are generally prevented from rotating. By way of a non-limiting example, and as shown in FIG. 15, the first and second recess 304, 308 may have a generally hexagonal shape. The engagement members 120, 124 may have a similar hexagonal shape or may have different acircular shapes. It should be understood, however, that the engagement members 120, 124 and the first and second recesses 304, 308 may be of any appropriate shape and is not limited to the shapes shown and described herein. By way of a non-limiting example, the engagement members 120, 124 and the first and second recesses 304, 308 may be of a generally acircular shape.

The engagement of the engagement members 120, 124 and the first and second recesses 304, 308 may generally prevent rotation of the engagement members 120, 124 during operative engagement of the fasteners with the coupler mount 256, or more specifically, the towed vehicle engaging portion 282 with the towed vehicle. This may make engagement between the adjustable mount coupler 220 and the towed vehicle easier for the operator.

Further still, the engagement members 120, 124 may generally prevent rattling that may otherwise occur upon operative engagement of the channel mount 256 with the towed vehicle. In these embodiments, the fasteners may be threaded through the engagement members 120, 124 during operative installation. By tightening the fasteners with the engagement members 120, 124; the channel mount 256 is pulled tight to one side, which generally prevents rattle. The fastener may have sufficient length to pass through both sides of the channel mount 256. The fastener may or may not require an additional nut on the outside of the channel mount 256.

Figure 16:
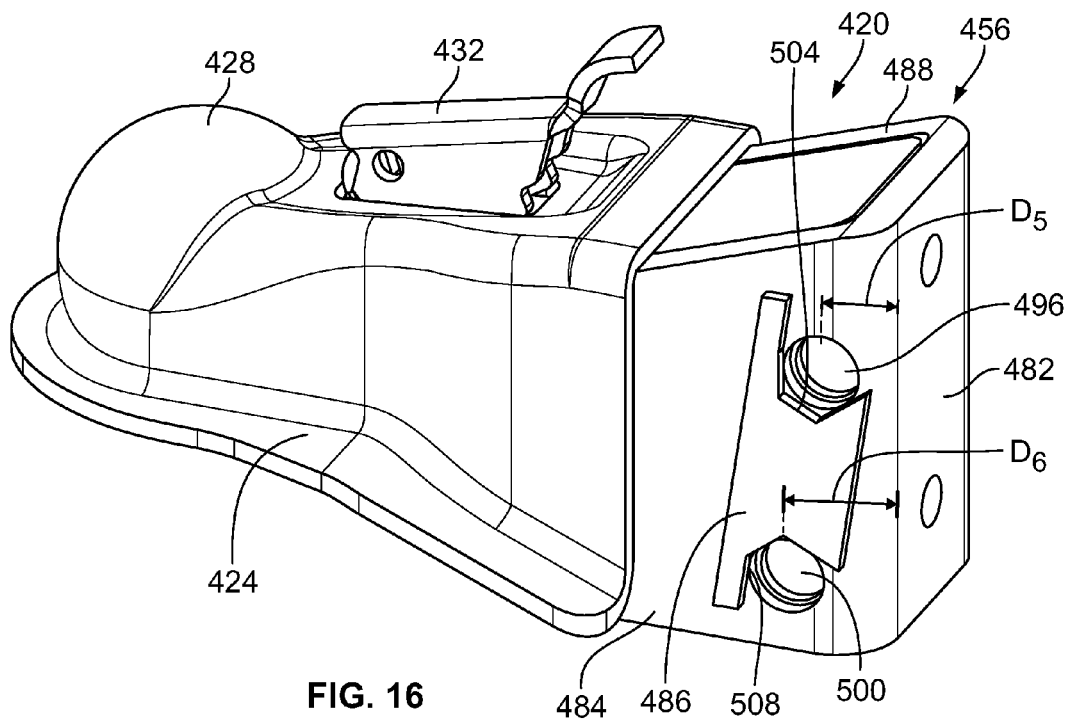
FIG. 16 is a perspective view of an embodiment of an adjustable mount coupler.

A further exemplary embodiment of an adjustable mount coupler 420 is shown in FIG. 16. The adjustable mount coupler 420 may be a 2 5/16 of an inch steel version of a hitch ball coupler. The adjustable mount coupler 420 may include a body 424. The body 424 may be formed of any appropriate material, including, without limitation steel. The body 424 may be cast, stamped, or formed in any other appropriate method. The body 424 may include a socket 428. The socket 428 may be configured to operatively and selectively engage a correspondingly shaped and sized hitch ball (not shown) of a towing vehicle.

The adjustable mount coupler 420 may further include a handle 432 operatively secured to the body 424. The handle 432 may be actuated to operatively and selectively engage and disengage the hitch ball when positioned within the socket 428. The handle 432 may be of any appropriate configuration. The present teachings are not limited to the configuration shown.

The adjustable mount coupler 420 may further include a channel mount 456. The channel mount 456 may be configured to operatively secure the adjustable mount coupler 420 with a towed vehicle. The channel mount 456 may include a towed vehicle engaging portion 482 configured to be operatively secured with the towed vehicle in any appropriate manner. The towed vehicle engaging portion 482 may be of any appropriate configuration.

The towed vehicle engaging portion 482 may include first and second end portions 484, 488, respectively. In some embodiments, the first end portion 484 may include first and second apertures 496, 500 laterally spaced from one another. The first and second apertures 496, 500 may be offset from one another as shown in FIG. 16. Specifically, the distance $D_5$ from an edge of the boxed portion 483 to a center of the first aperture 496 may be different from the distance $D_6$ from the edge of the edge of the boxed portion 483 to a center of the second aperture 500. By way of a non-limiting example, the distance $D_5$ may be less than the distance $D_6$. Further, the distance $D_5$ may be greater than the distance $D_6$, i.e., the first and second apertures 496, 500 may be offset the other direction.

The first end portion 484 may further include a generally flat stock member 486. The generally flat stock member 486 may be formed from a relatively thick metal, such as steel. The flat stock member 486 may be attached with the first end portion 484 in any appropriate manner, including, without limitation, welding, fastening, or forming monolithically therewith. The flat stock member 486 may include first and second anti-rotation portions 504, 508 formed therein. The first and second anti-rotation portions 504, 508 may generally circumscribe a portion of the first and second apertures 496, 500, respectively. The first and second recessed portions 504, 508 may be of any appropriate configuration. In particular, the first and second anti-rotation portions 504, 508 may have a generally acircular shape. The shape of the first and second anti-rotation portions 504, 508 may create a non-rotational surface as described in more detail below. It should be understood, the first and second anti-rotation portions 504, 508 may be of any appropriate size and shape and is not limited to that shown and described herein.

The second end portion 488 may include third and fourth apertures be offset from one another and may be generally aligned with respect to the first and second apertures 496, 500, respectively. The apertures being offset may provide an anti-sag feature for the adjustable mount coupler 420 when operatively secured with the towing and towed vehicles. The offset aperture pattern may result in the adjustable mount coupler 420 being angled slightly downward when in its operative position, i.e., when operatively coupled with the towing and towed vehicle. This downward angle may allow the adjustable mount coupler 420 to remain generally level or perpendicular to the towed vehicle when under an operative load. This may generally prevent unwanted or undesirable sagging between the adjustable mount coupler 420 and the towed vehicle.

The channel mount 456 may further include the first and second engagement members 120, 124 described above. Specifically, the first and second engagement members 120, 124 may be operatively engaged within the first and second anti-rotation portions 504, 508. The engagement members 120, 124 may be of any appropriate configuration, including, by way of a non-limiting example, acircular nuts—see FIG. 8. The engagement members 120, 124 may be configured to operatively engage the first and second anti-rotation portions 504, 508, which may be of substantially similar configuration or of a different configuration. The configurations of the engagement members 120, 124 and the first and second anti-rotation portions 504, 508 may be such that once the engagement members 120, 124 are engaged with the first and second anti-rotation portions 504, 508, the engagement members 120, 124 are generally prevented from rotating. By way of a non-limiting example, and as shown in FIG. 16, the first and second anti-rotation portions 504, 508 may have a generally hexagonal shape. The engagement members 120, 124 may have a similar hexagonal shape or may have different acircular shapes. It should be understood, however, that the engagement members 120, 124 and the first and second anti-rotation portions 504, 508 may be of any appropriate shape and is not limited to the shapes shown and described herein. By way of a non-limiting example, the engagement members 120, 124 and the first and second anti-rotation portions 504, 508 may be of a generally acircular shape.

The engagement of the engagement members 120, 124 and the first and second anti-rotation portions 504, 508 may generally prevent rotation of the engagement members 120, 124 during operative engagement of the fasteners with the coupler mount 456, or more specifically, the towed vehicle engaging portion 482 with the towed vehicle. This may make engagement between the adjustable mount coupler 420 and the towed vehicle easier for the operator.

Further still, the engagement members 120, 124 may generally prevent rattling that may otherwise occur upon operative engagement of the channel mount 456 with the towed vehicle. In these embodiments, the fasteners may be threaded through the engagement members 120, 124 during operative installation. By tightening the fasteners with the engagement members 120, 124; the channel mount 456 is pulled tight to one side, which generally prevents rattle. The fastener may have sufficient length to pass through both sides of the channel mount 456. The fastener may or may not require an additional nut on the outside of the channel mount 456.

Figure 17:
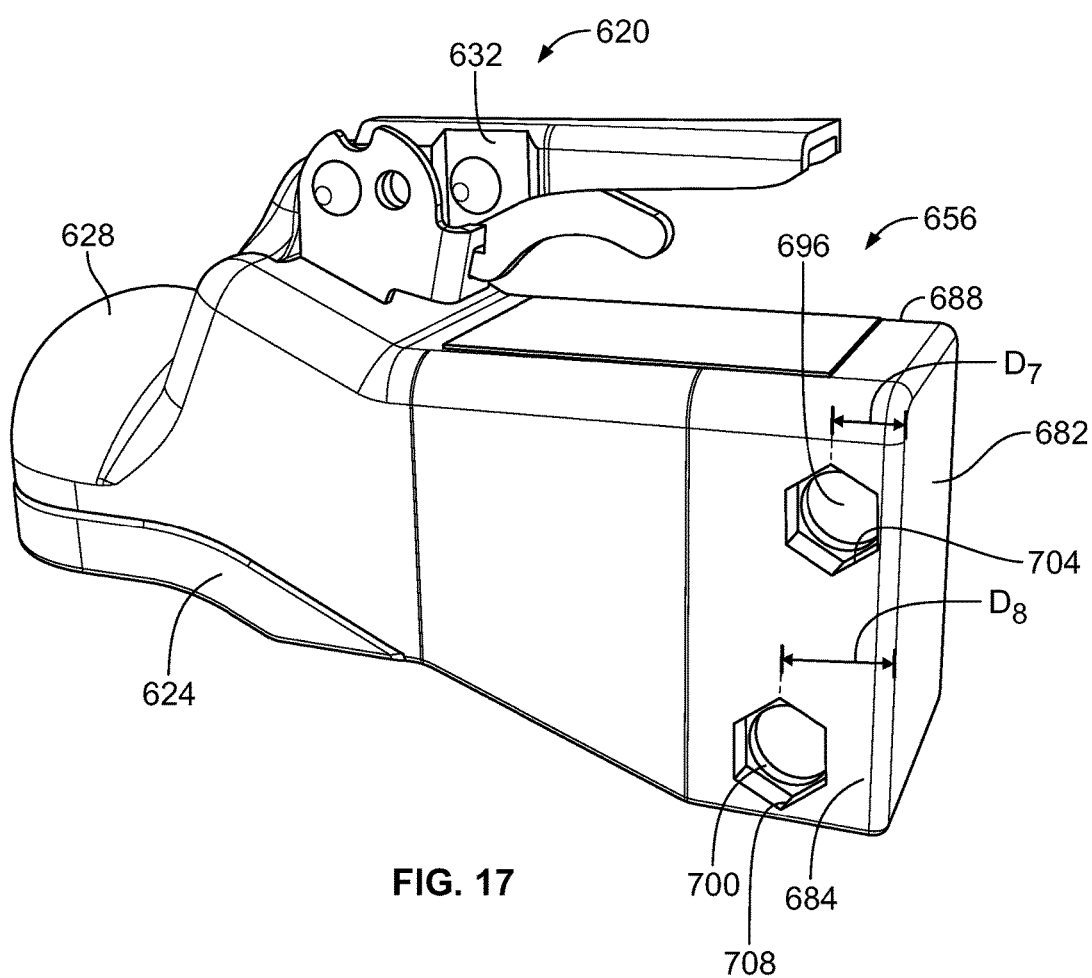
FIG. 17 is a perspective view of an embodiment of an adjustable mount coupler.
Figure 18:
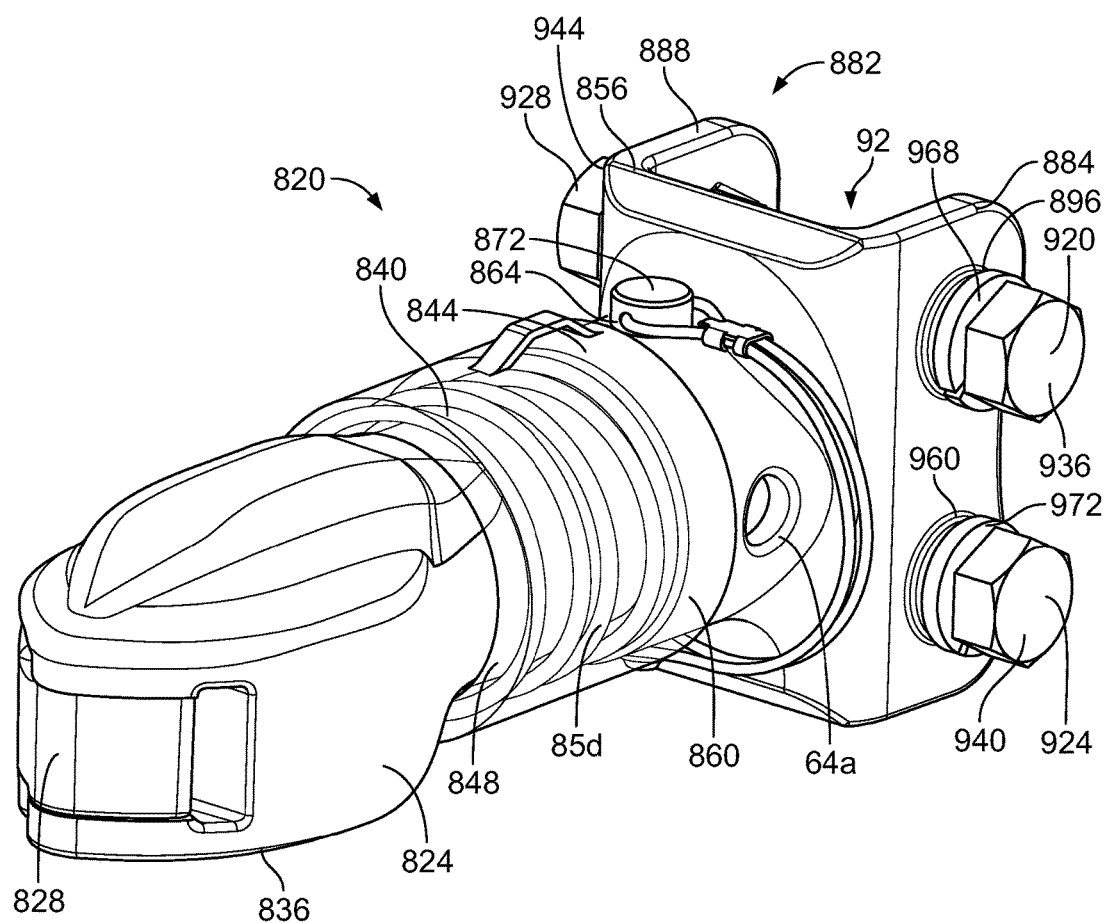
FIG. 18 is a perspective view of an embodiment of an adjustable mount coupler with a sleeve in phantom.

A further exemplary embodiment of an adjustable mount coupler 620 is shown in FIG. 17. The adjustable mount coupler 620 may be a 2 5/16 of an inch cast version of a hitch ball coupler. The adjustable mount coupler 620 may include a body 624. The body 624 may be formed of any appropriate material, including, without limitation steel. The body 624 may be cast as a monolithic member. The body 624 may include a socket 628 monolithically formed therewith. The socket 628 may be configured to operatively and selectively engage a correspondingly shaped and sized hitch ball (not shown) of a towing vehicle.

The adjustable mount coupler 620 may further include a handle 632 operatively secured to the body 624. The handle 632 may be actuated to operatively and selectively engage and disengage the hitch ball when positioned within the socket 628. The handle 632 may be of any appropriate configuration. The present teachings are not limited to the configuration shown.

The adjustable mount coupler 620 may further include a channel mount 656. The channel mount 656 may be configured to operatively secure the adjustable mount coupler 620 with a towed vehicle. The channel mount 656 may include a towed vehicle engaging portion 682 configured to be operatively secured with the towed vehicle in any appropriate manner. The towed vehicle engaging portion 682 may be of any appropriate configuration.

The towed vehicle engaging portion 682 may include first and second end portions 684, 688, respectively. In some embodiments, the first end portion 684 may include first and second apertures 696, 700 laterally spaced from one another. The first and second apertures 696, 700 may be offset from one another as shown in FIG. 17. Specifically, the distance $D_7$ from an edge of the boxed portion 683 to a center of the first aperture 696 may be different from the distance $D_8$ from the edge of the edge of the boxed portion 683 to a center of the second aperture 700. By way of a non-limiting example, the distance $D_7$ may be less than the distance $D_8$. Further, the distance $D_7$ may be greater than the distance $D_8$, i.e., the first and second apertures 696, 700 may be offset the other direction.

The first end portion 684 may further include first and second recessed portions 704, 708, respectively generally circumscribing the first and second apertures 696, 700. The first and second recessed portions 704, 708 may be of any appropriate configuration. In particular, the first and second recessed portions 704, 708 may have a generally acircular shape. The shape of the first and second recessed portions 704, 708 may create a non-rotational surface as described in more detail below. It should be understood, the first and second recessed portions 704, 708 may be of any appropriate size and shape and is not limited to that shown and described herein.

The second end portion 688 may include third and fourth apertures be offset from one another and may be generally aligned with respect to the first and second apertures 696, 700, respectively. The apertures being offset may provide an anti-sag feature for the adjustable mount coupler 620 when operatively secured with the towing and towed vehicles. The offset aperture pattern may result in the adjustable mount coupler 620 being angled slightly downward when in its operative position, i.e., when operatively coupled with the towing and towed vehicle. This downward angle may allow the adjustable mount coupler 620 to remain generally level or perpendicular to the towed vehicle when under an operative load. This may generally prevent unwanted or undesirable sagging between the adjustable mount coupler 620 and the towed vehicle.

The channel mount 656 may further include the first and second engagement members 120, 124 described above. Specifically, the first and second engagement members 120, 124 may be operatively engaged within the first and second recesses 704, 708. The engagement members 120, 124 may be of any appropriate configuration, including, by way of a non-limiting example, acircular nuts—see FIG. 8. The engagement members 120, 124 may be configured to operatively fit within the first and second recesses 704, 708, which may be of substantially similar configuration or of a different configuration. The configurations of the engagement members 120, 124 and the first and second recesses 704, 708 may be such that once the engagement members 120, 124 are inserted into the first and second recesses 704, 708, the engagement members 120, 124 are generally prevented from rotating. By way of a non-limiting example, and as shown in FIG. 17, the first and second recess 704, 708 may have a generally hexagonal shape. The engagement members 120, 124 may have a similar hexagonal shape or may have different acircular shapes. It should be understood, however, that the engagement members 120, 124 and the first and second recesses 704, 708 may be of any appropriate shape and is not limited to the shapes shown and described herein. By way of a non-limiting example, the engagement members 120, 124 and the first and second recesses 704, 708 may be of a generally acircular shape.

The engagement of the engagement members 120, 124 and the first and second recesses 704, 708 may generally prevent rotation of the engagement members 120, 124 during operative engagement of the fasteners with the coupler mount 656, or more specifically, the towed vehicle engaging portion 682 with the towed vehicle. This may make engagement between the adjustable mount coupler 620 and the towed vehicle easier for the operator.

Further still, the engagement members 120, 124 may generally prevent rattling that may otherwise occur upon operative engagement of the channel mount 656 with the towed vehicle. In these embodiments, the fasteners may be threaded through the engagement members 120, 124 during operative installation. By tightening the fasteners with the engagement members 120, 124; the channel mount 656 is pulled tight to one side, which generally prevents rattle. The fastener may have sufficient length to pass through both sides of the channel mount 656. The fastener may or may not require an additional nut on the outside of the channel mount 656.

A further exemplary embodiment of an adjustable mount coupler 820 is shown in FIGS. 18-20, and 22-23. The adjustable mount coupler 820 may include a body 824 and a cap 828 of any appropriate configuration. The cap 828 and body 824 may be pivotably coupled together. The body 824 and cap 828 may be arranged to form a cavity or a socket 836 that is generally semispherical in shape. By way of a non-limiting example, recesses in both the body 824 and cap 828 may cooperate to form the socket 836. The socket 836 may be generally arranged to accommodate or receive a spherically shaped hitch ball mounted to a towing vehicle. The socket 836 may be arranged to accept hitching components that have shapes other than spherical depending on the intended use of the adjustable mount coupler 820.

The body 824 may include a generally hollow tubular portion 840 extending from the cap 828. The adjustable mount coupler 820 may include a collar 844 mounted to a rear portion 848 of the body 824. The collar 844 may be mounted so that it may slide toward and away from the cap 828 and body 824. The adjustable mount coupler 820 may be configured such that when it is placed in the closed position, the collar 844 may slide toward the cap 828 and body 824 to hold the cap 828 proximate to or in contact with the body 824. Such an arrangement secures the cap 828 in close proximity with the body 824 and, thus, secures the adjustable mount coupler 820 in the closed position. When the collar 844 is slid rearward and away from the cap 828 and body 824, the cap 828 is free to rotate about the hinge 832 into the open position. Further, a spring (not shown) may be arranged to bias the adjustable mount coupler 820 to the open position. The spring may be positioned relative to the cap 828 to bias the cap 828 in the open position. In these embodiments, the operator may overcome the biasing force of the spring to close the cap 828 relative to the body 824. Further still, the adjustable mount coupler 820 may include a biasing member 852 such as a spring, which may bias the collar 844 toward the cap 828 and body 824, i.e., a forward position. The biasing member 852 may generally circumscribe the tubular portion 840 biasing the collar 844 toward the cap 828. When the collar 844 is in the forward position, it may releasably secure the cap 828 proximate to or in contact with the body 824 to secure the adjustable mount coupler 820 in the closed position. It will be appreciated by those of ordinary skill in the art that the collar 844 may be moved or slid away from the cap 828 and body 824 to a rear position to release the cap 828 from contact with the body 824. This allows the spring to move the adjustable mount coupler 820 to the open position.

The adjustable mount coupler 820 may include a channel mount 856 attached with the body 824 in any appropriate manner. By way of a non-limiting example, the channel mount 856 may be attached with the tubular portion 840 of the body 824 in any appropriate manner. The channel mount 856 may be adjustable as is described in more detail below, e.g., it may attach with a plurality of different sized towed vehicles. It should be further understood that the channel mount 856 may be operatively attached with any coupler assembly.

In some embodiments, the channel mount 856 may include a body engaging portion 860 selectively engageable with the tubular portion 840 of the body 824. The body engaging portion 860 may be of a corresponding shape of the tubular portion 840. For example, the body engaging portion 860 may be of a generally circular cross-sectional shape and may be of a size to accept the tubular portion 840 therein. A snapper pin 872 may attach the body engaging portion 860 and tubular portion 840 such as described in more detail above.

The body engaging portion 860 may include at least one aperture 864. As shown in the drawings, the body engaging portion 860 may include first and second pairs of apertures 864, 864a. The first pair of apertures 864 may be positioned on vertically opposed sides of the body engaging portion 860. The second pair of apertures 864a may be positioned on horizontally opposed sides of the body engaging portion 860, which results in the apertures 864, 864a being generally spaced around the circumference of the body engaging portion 860. In these embodiments, the apertures 864, 864a may be positioned such that they extend into the hollow portion of the body engaging portion 860. This may result in the apertures 864, 864a extending through the body engaging portion 860. The present teachings, however, are not limited to this configuration. Any appropriate configuration may be utilized without departing from the present teachings. In some embodiments, the apertures 864 may be utilized to operatively engage the tubular portion 840 with the body engaging portion 860 as described in more detail below. Further, in some embodiments the apertures 864a may be utilized to plug weld the body engaging portion 860 with the tubular portion 840.

The tubular portion 840 may include a pair of opposed apertures that generally align with the first pair of apertures 864 of the body engaging portion 860 upon operative engagement of the tubular portion 840 and body engaging portion 860. In these embodiments, a fastener 872 may be vertically inserted into and engaged with the apertures 864 of the body engaging portion 860 and apertures of the tubular portion 840. The fastener 872 may be of any appropriate configuration. By way of a non-limiting example, the fastener 872 may be a snapper pin 872. The snapper pin 872 may be of any appropriate configuration and is not limited to that shown and described herein.

The channel mount 856 may include a towed vehicle engaging portion 882 configured to be operatively secured with the towed vehicle in any appropriate manner. The towed vehicle engaging portion 882 may be of any appropriate configuration. By way of a non-limiting example, the towed vehicle engaging portion 882 may include a pair of flanged members—a first flanged member 884 and a second flanged member 888—extending from the body engaging portion 860. The flanged members 884, 888 may be attached with the body engaging portion 860 in any appropriate manner. The first and second flanged members 884, 888 may be spaced apart from one another. This may result in a channel or void 892 being positioned between the first and second flanged member 884, 888.

Figure 20:
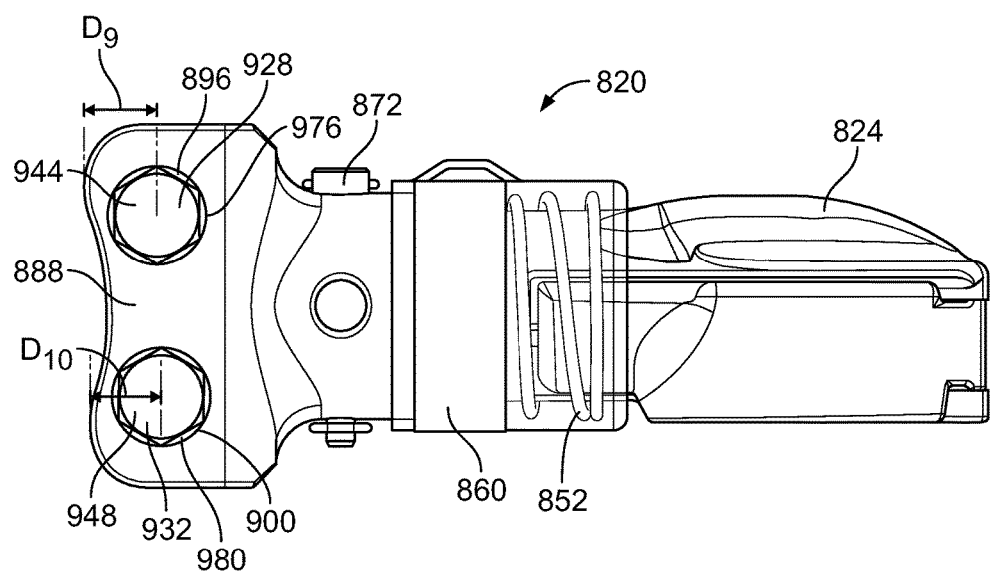
FIG. 20 is a side view of the adjustable mount coupler of FIG. 18 with the sleeve in phantom.
Figure 21:
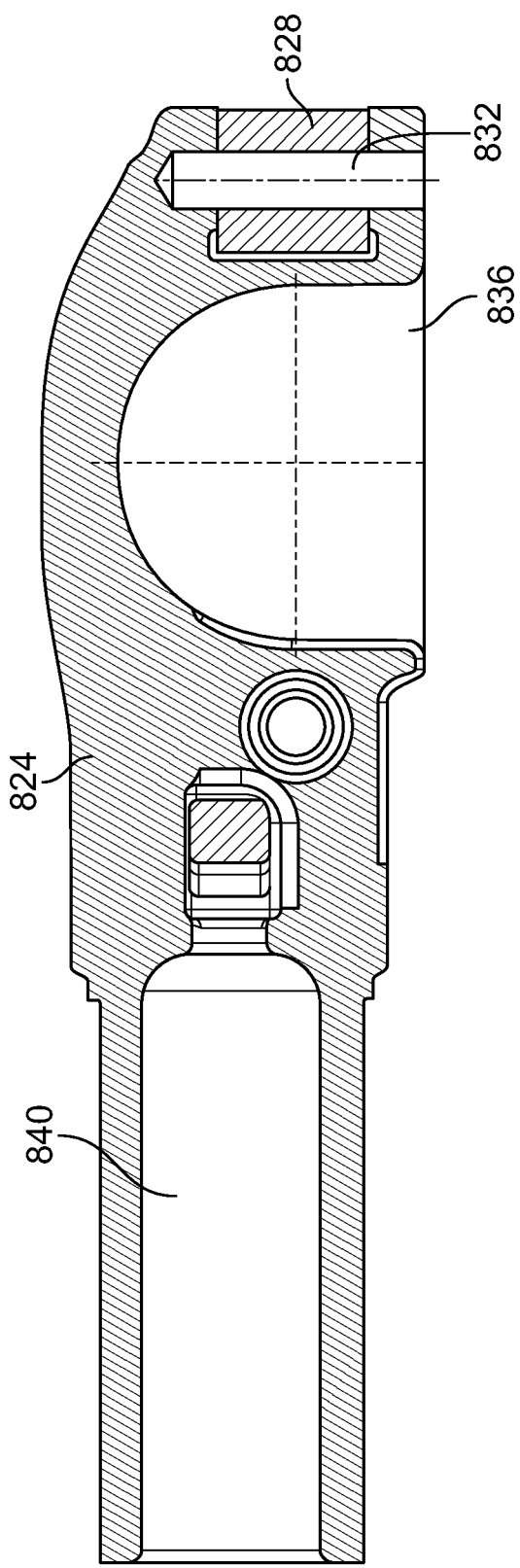
FIG. 21 is a cross-sectional view of a body and cap of the adjustable mount coupler of FIG. 18.
Figure 22:
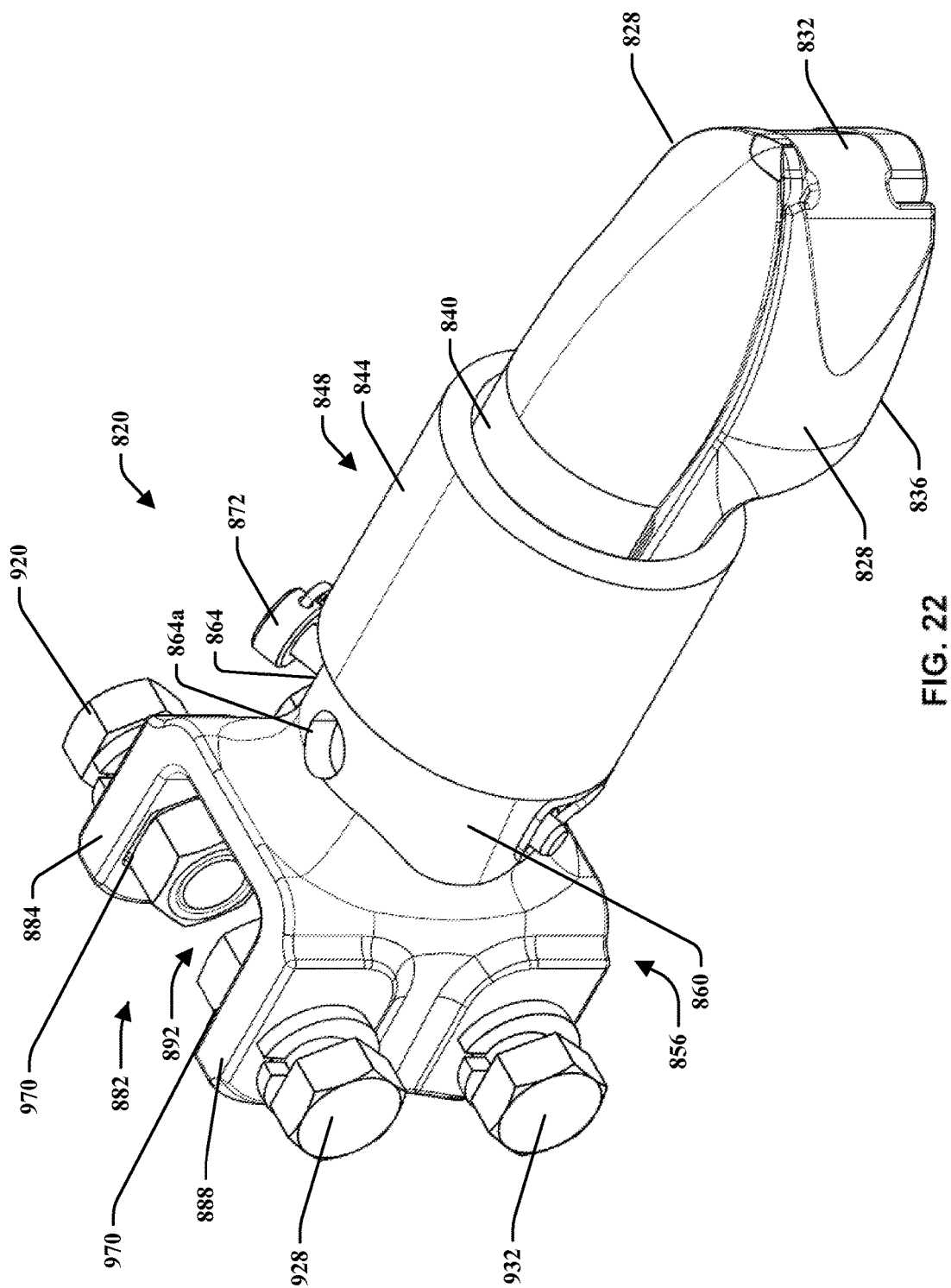
FIG. 22 is a perspective view of an embodiment of an adjustable mount coupler.

The first and second flanged members 884, 888 may include first and second apertures 896, 900 laterally spaced from one another. The first and second apertures 896, 900 may be offset as shown in FIG. 20. Specifically, the distance $D_9$ from an edge of the flanged member 888 to a center of the first aperture 896 may be different from the distance $D_{10}$ from the edge of the edge of the flanged member 888 to a center of the second aperture 900. By way of a non-limiting example, the distance $D_9$ may be less than the distance $D_{10}$. Further, the distance $D_9$ may be greater than the distance $D_{10}$, i.e., the first and second apertures 896, 900 may be offset the other direction.

The channel mount 856 may further include first and second engagement members 920, 924, respectively, that may be operatively engaged within the first and second apertures 896, 900 on the first flanged member 884 and third and fourth engagement members 928, 932 operatively engaged within the first and second apertures 896, 900 on the second flanged member 888. The engagement members 920, 924, 928, 932 may be of any appropriate configuration. By way of a non-limiting example, the engagement members 920, 924, 928, 932 may comprise bolts 936, 940, 944, 948 that are about 1.5 inches in length (the bolts of the engagement members of some of the embodiments disclosed above may be about 4.5 inches in length).

The first end portion 884 and second end portion 888 may further include first and second recessed portions 970, 974, respectively generally circumscribing the first and second apertures 896, 900. The first and second recessed portions 970, 974 may be positioned along an inner portion of the first end portion 884 and second end portion 888. The inner portion may be within the channel 892. The first and second recessed portions 970, 974 may be of any appropriate configuration. In particular, the first and second recessed portions may have a generally acircular shape. The shape of the first and second recessed portions may create a non-rotational surface. It should be understood, the first and second recessed portions may be of any appropriate size and shape and is not limited to that shown and described herein. The first and second recessed portions may be cast or stamped with the channel mount 856 and may also be formed with the body 824.

Figure 19:
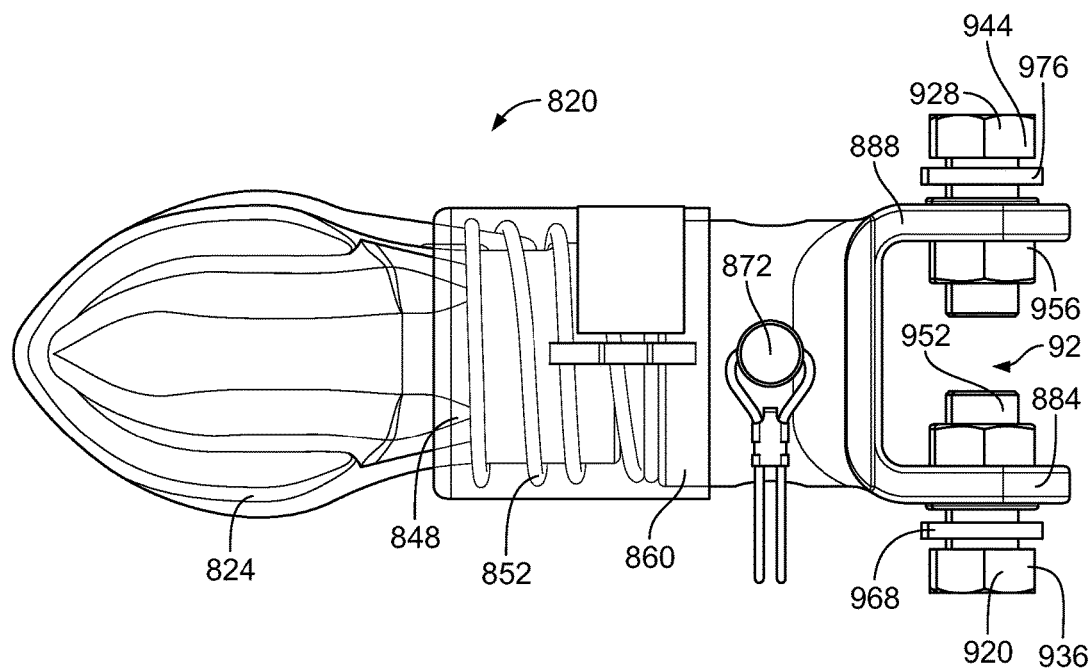
FIG. 19 is a top view of the adjustable mount coupler of FIG. 18 with the sleeve in phantom.

The engagement members 920, 924, 928, 932 may each include a nut 952 and 956 selectively attach with the bolts 936, 940, 944, 948 as shown in FIG. 19. While two nuts 952 and 956 are shown, the present teachings may include a corresponding number of nuts as bolts. The nuts 952 and 956 may be attached to the first and second flanged members 884, 888 and may be positioned within the channel 892. By way of a non-limiting example, the nuts 952 and 956 may be tack welded inside the first and second flanged members 884, 888 to keep them from falling out during assembly. Further, the nuts 952 and 956 may engage in recesses 970, 974, respectively generally circumscribing the first and second apertures 896, 900. The recesses 970, 974 may be formed in the first and second flange members 884, 888, i.e., in the inside of the first and second flanged members 884, 888. The recesses may have a mating shaped and sized recess as the nuts 952 and 956. In these embodiments, the nuts 952 and 956 may engage or more specifically be positioned within the corresponding recesses. This engagement may react with the tightening torque without transferring significant forces to the tack welding between the nuts 952 and 956 and the first and second flanged members 884, 888. By way of a non-limiting example, the recesses may be generally hexagonal. However, the present teachings are not limited to this shape. Any appropriate acircular shape may be utilized without departing from the present teachings.

The engagement members 920, 924, 928, 932 may include washers 968, 972, 976, 980. The washers 968, 972, 976 and 980 may generally prevent the bolts 936, 940, 944, 948 from loosening from the nuts 952, 956, 960, 964.

During assembly the engagement members 920, 924, 928, 932 may be tightened one of the first or second flanged member 884, 888 and then the other. The engagement members 920, 924, 928, 932 may generally prevent rattling that may otherwise occur upon operative engagement of the channel mount 856 with the towed vehicle. More specifically, the engagement members 920, 924, 928, 932 may provide a zero clearance fit. In these embodiments, the bolts 936, 940, 944, 948 may be threaded through the nuts 952, 956, 960, 964 during operative installation. By tightening the bolts 936, 940, 944, 948 with the nuts 952, 956, 960, 964; the channel mount 856 is pulled tight to one side of the channel 892, which generally prevents rattle.

Figure 23:
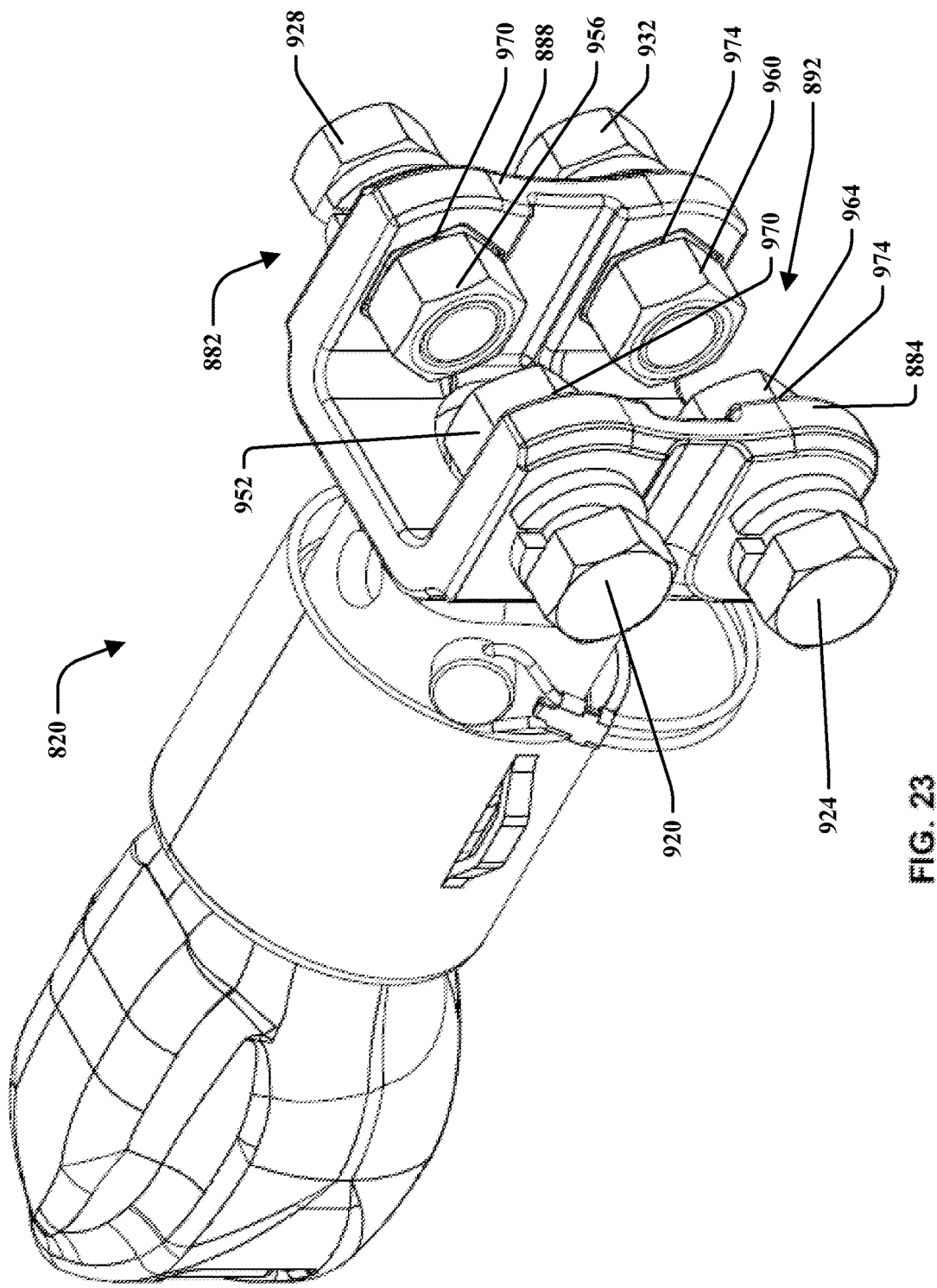
FIG. 23 is a perspective view of an embodiment of an adjustable mount coupler.
Figure 24:
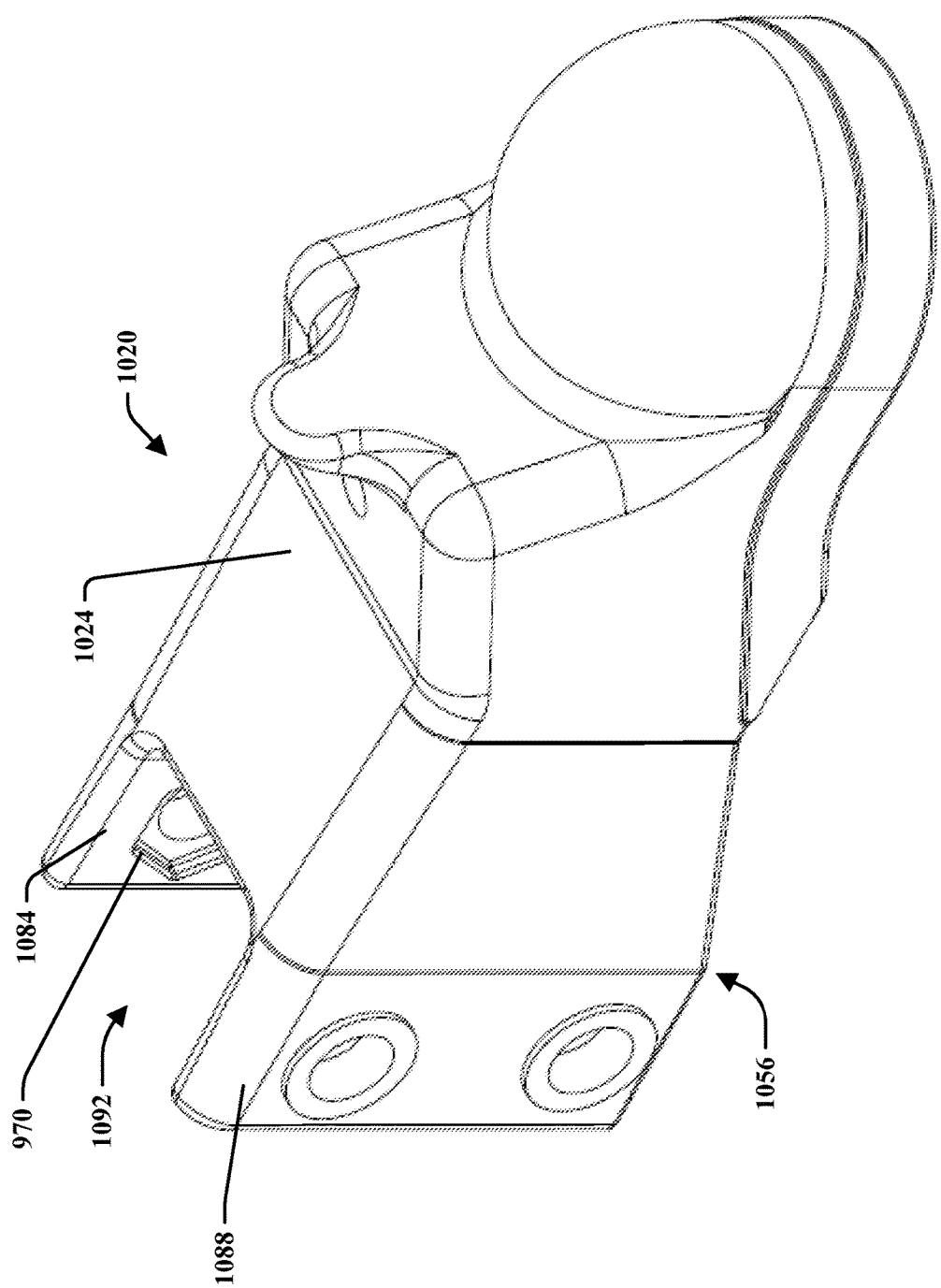
FIG. 24 is a perspective view of an embodiment of an adjustable mount coupler.
Figure 25:
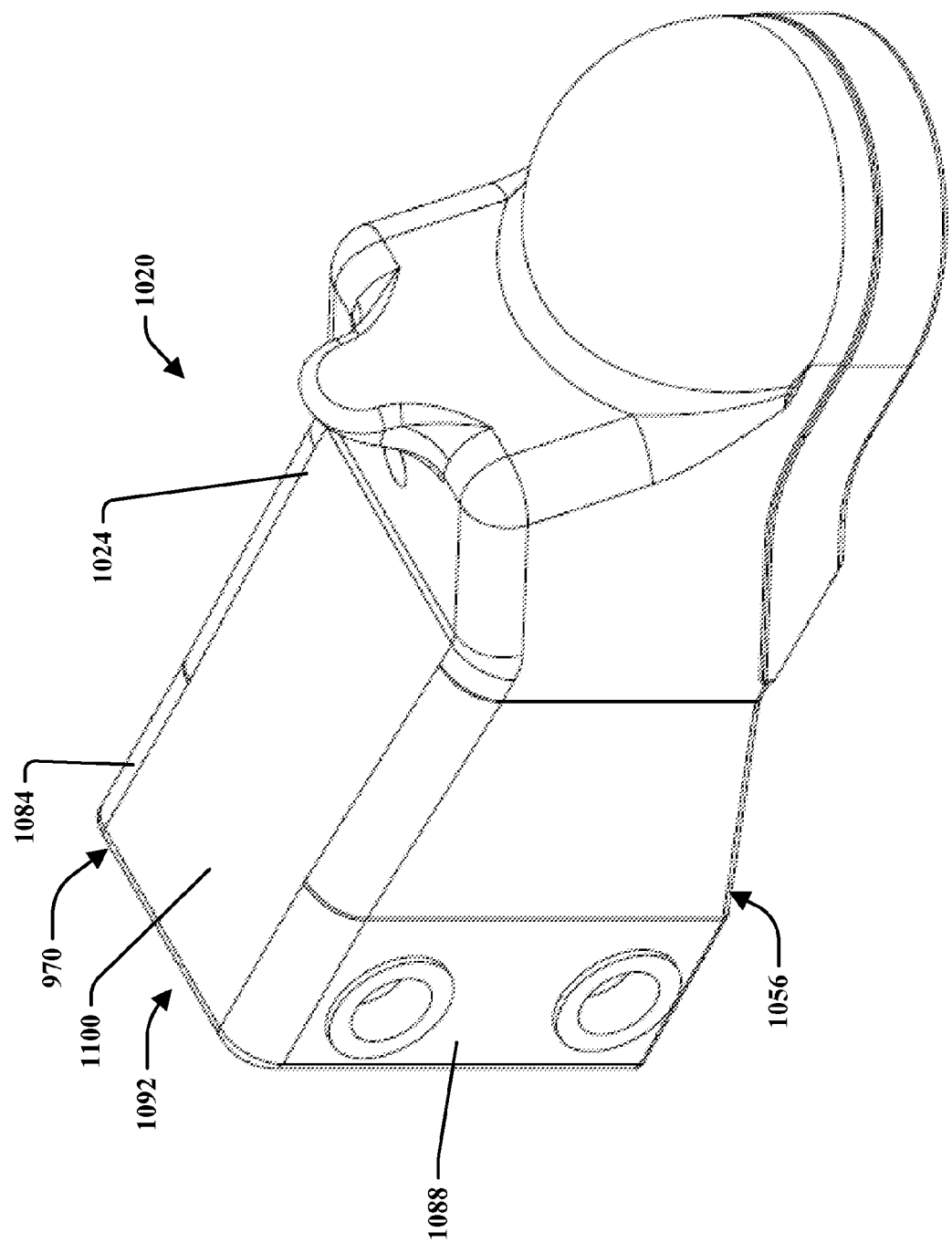
FIG. 25 is a perspective view of an embodiment of an adjustable mount coupler.

FIGS. 23 and 24 illustrate embodiments of the adjustable mount coupler with many of the common features as described above as it may be utilized with other hitch ball mounts. The coupler 1020 includes a body 1024 that defines a socket for receiving a hitch ball. The body 1024 may be of any configuration and shape and includes a channel mount 1056. The channel mount 1056 may include a first end portion 1084 and a second end portion 1088 configured to receive fasteners therein and as described above. The first end portion 1084 and second end portion 1088 may further include first and second recessed portions 1070, 1074, respectively generally circumscribing the apertures therein. The first and second recessed portions 1070, 1074 may be positioned along an inner portion of the first end portion 1084 and second end portion 1088 within the channel 1092. The first and second recessed portions 970, 974 may be of any appropriate configuration. In particular, the first and second recessed portions may have a generally acircular shape. The shape of the first and second recessed portions may create a non-rotational surface. It should be understood, the first and second recessed portions may be of any appropriate size and shape and is not limited to that shown and described herein. The first and second recessed portions may be cast or stamped with the channel mount 856 and may also be formed with the body 824.

FIG. 24 illustrates an embodiment wherein the coupler 1020 includes a channel mount 1056 having a panel 1100 that extends between the first and second end portion 1084, 1088. These end portions may also include acircular recesses along the inner surfaces thereon to allow fasteners such as nuts to engage within the recess portions to allow for ease of assembly and prevent rattling.

Although the embodiments of the present teachings have been illustrated in the accompanying drawings and described in the foregoing detailed description, it is to be understood that the present teachings are not to be limited to just the embodiments disclosed, but that the present teachings described herein are capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A channel mount coupler comprising:
   a body;
   a socket extending from the body and configured to accept a hitch ball; and
   a channel mount extending from the body, the channel mount comprising:
      a body engaging portion selectively engageable with the body;
      a first flange, the first flange including at least one aperture and at least one recess generally circumscribing the aperture, the recess being generally acircular;
      a second flange spaced from the first flange;
      an engagement member engaged with the recess; and
      a fastener engageable with the engagement member and the at least one aperture, wherein engagement of the engagement member and recess prevents rotation of the engagement member during engagement of the fastener with the engagement member, wherein the first flange and second flange are monolithically formed with the body engaging portion, whereby the first and second flanges are engageable with a towed vehicle.

2. The channel mount coupler of claim 1, wherein the at least one aperture of the first flange includes first and second apertures offset from one another.

3. The channel mount coupler of claim 2, wherein the first aperture is a first distance from an edge of the channel mount and the second aperture is a second distance from the edge of the channel mount whereby the first and second distances are different.

4. The channel mount coupler of claim 3, wherein the first distance is greater than the second distance.

5. The channel mount coupler of claim 1, wherein the engagement member includes a nut having a generally acircular shape.

6. The channel mount coupler of claim 5, wherein the acircular recess is of a substantially corresponding shape as the nut.

7. The channel mount coupler of claim 6, wherein the recess is generally hexagonal in shape and the nut is generally hexagonal in shape.

8. The channel mount coupler of claim 1, wherein the second flange includes at least one aperture generally aligned with the at least one aperture of the first flange.

9. The channel mount coupler of claim 1, wherein the first flange has a first thickness and the second flange has a second thickness whereby the first thickness is greater than the second thickness.

10. A channel mount coupler comprising:
    a body;
    a socket extending from the body, the socket configured to accept a hitch ball; and
    a channel mount comprising:
       a body engaging portion selectively engageable with the body;
       a first flange, the first flange including first and second apertures spaced apart and offset from one another; and
       a second flange spaced from the first flange, wherein the first and second flanges are engageable with a towed vehicle, wherein the flanged members are monolithically formed with the body engaging portion.

11. The channel mount coupler of claim 10, wherein the second flange includes third and fourth apertures, whereby the third aperture is generally aligned with the first aperture and the fourth aperture is generally aligned with the second aperture.

12. The channel mount coupler of claim 11, wherein the first and third apertures are a first distance from an edge of the channel mount and the second and fourth apertures are a second distance from the edge of the channel mount, wherein the first and second distances are different.

13. The channel mount of claim 12, wherein the first distance is greater than the second distance.

14. The channel mount of claim 11, wherein the first flange includes first and second acircular recess generally circumscribing the first and second apertures along an inner surface of the first and second flanges.

15. The channel mount of claim 14, wherein the channel mount further includes:
    a nut engaged with the first recess;
    a fastener engageable with the nut and insertable into and through the first aperture, whereby engagement of the nut with the recess prevents rotation of the nut during engagement of the fastener with the nut.

16. A channel mount coupler comprising:
a body;
a socket extending from the body, the socket configured to accept a hitch ball; and
a channel mount extending from the body, the channel mount comprising:
   a first flange, the first flange having a first thickness; and
   a second flange spaced from the first flange, the second flange having a second thickness, wherein the first thickness is greater than the second thickness and the first and second flanges are engageable with a towed vehicle wherein the channel mount includes a first width between the first and second flanges whereby the channel mount is engageable with the towed vehicle having a first dimension and the channel mount includes a second width between the first and second flanges where the channel mount is engageable with a second towed vehicle having a second dimension.

17. The channel mount coupler of claim 16, wherein the first flange includes an aperture and a recess generally circumscribing the aperture, the recess being generally acircular.

18. The channel mount coupler of claim 16, wherein the channel mount further comprises:
an engagement member selectively engageable with the recess;
a fastener engageable with the engagement member and the aperture, wherein engagement of the engagement member and recess prevents rotation of the engagement member during engagement of the fastener with the engagement member.

19. The channel mount coupler of claim 18, wherein the engagement member is removable from the recess, whereby the channel mount is engageable with the second towed vehicle having the second dimension.

20. The channel mount coupler of claim 19, wherein the first width is larger than the second width.

21. The channel mount coupler of claim 19, wherein the first dimension is 3" and the second dimension is 2.875".

22. A channel mount coupler comprising:
a body;
a socket extending from the body and configured to accept a hitch ball; and
a channel mount extending from the body, the channel mount comprising:
   a first width wherein the channel mount is engageable with a towed vehicle having a first dimension and a second width wherein the channel mount is engageable with a second towed vehicle having a second dimension;
   at least one aperture and at least one recess generally circumscribing the aperture, the recess being generally acircular;
   an engagement member engaged with the recess; and
   a fastener engageable with the engagement member and the at least one aperture, wherein engagement of the engagement member and recess prevents rotation of the engagement member during engagement of the fastener with the engagement member.

23. A channel mount coupler comprising:
a body;
a socket extending from the body, the socket configured to accept a hitch ball; and
a channel mount extending from the body in a direction opposite of the socket, the channel mount including first and second apertures spaced apart and offset from one another wherein the first and second apertures include a recess portion that generally circumscribes the apertures, the recess being generally acircular.

24. The channel mount coupler of claim 23, wherein the recess portions are along an inner surface of the channel mount.

25. A channel mount coupler comprising:
a body;
a socket extending from the body, the socket configured to accept a hitch ball; and
a channel mount extending from the body in a direction opposite of the socket, the channel mount first and second apertures spaced apart and offset from one another and a plate member having first and second non-rotating surfaces generally circumscribing a portion of the first and second apertures.

* * * * *